US008486501B2

(12) United States Patent
Manabe et al.

(10) Patent No.: US 8,486,501 B2
(45) Date of Patent: Jul. 16, 2013

(54) PLASTIC AMPULE AND COLORED PLASTIC CONTAINER

(75) Inventors: Yuki Manabe, Naruto (JP); Tadaaki Inoue, Naruto (JP); Hideshi Okamoto, Naruto (JP); Keiichi Kawakami, Naruto (JP); Koichi Takeda, Naruto (JP)

(73) Assignee: Otsuka Pharmaceutical Factory, Inc., Naruto-Shi, Tokushima (*) Notice: Subject to any disclaimer, the term of this patent is extended or adjusted under 35 U.S.C. 154(b) by 368 days.

(21) Appl. No.: 12/922,615

(22) PCT Filed: Mar. 14, 2008

(86) PCT No.: PCT/JP2008/054768
§ 371 (c)(1),
(2), (4) Date: Dec. 10, 2010

(87) PCT Pub. No.: WO2009/113177
PCT Pub. Date: Sep. 17, 2009

(65) Prior Publication Data

US 2011/0100861 A1 May 5, 2011

(51) Int. Cl.
*B29D 22/00* (2006.01)

(52) U.S. Cl.
USPC .............................. 428/35.7; 215/47; 604/200

(58) Field of Classification Search
USPC .............. 428/35.7; 215/47; 206/524.6, 524.5; 604/200
See application file for complete search history.

(56) References Cited

U.S. PATENT DOCUMENTS

| | | | |
|---|---|---|---|
| 5,423,421 | A | 6/1995 | Inoue et al. |
| 5,723,189 | A | 3/1998 | Sudo |

(Continued)

FOREIGN PATENT DOCUMENTS

| | | | |
|---|---|---|---|
| EP | 1 616 549 | A1 | 1/2006 |
| EP | 1 847 242 | A1 | 10/2007 |

(Continued)

OTHER PUBLICATIONS

International Preliminary Report on Patentability dated Nov. 11, 2010 issued in corresponding International Application No. PCT/JP2008/054768.

(Continued)

*Primary Examiner* — N. Edwards

(74) *Attorney, Agent, or Firm* — Finnegan, Henderson, Farabow, Garrett & Dunner, L.L.P.

(57) ABSTRACT

An object of the present invention is to provide a plastic ampule capable of suppressing volatilization and scattering of a drug solution and elution of plastic compounding ingredients into the drug solution, as well as suppressing whisker formation and deformation and damage of an opening when the plastic ampule is opened. A plastic ampule 10 according to the present invention includes a drug solution storage part 11 for storing a drug solution, a drug solution discharge tube 12 in communication with the drug solution storage part 11 and extending toward one side, and a top part 13 closing an end at the one side of the drug solution discharge tube 12, and the drug solution discharge tube 12 includes a fragile part 14 formed to have a thin thickness along a circumferential direction. The drug solution storage part 11, the drug solution discharge tube 12, and the top part 13 are formed of a multilayer plastic material that includes an intermediate layer containing a cyclic olefin-based (co)polymer with a glass transition temperature of 60 to 80° C., an inner layer laminated to an inner side of the intermediate layer, an outer layer laminated to an outer side of the intermediate layer, and adhesive layers respectively disposed between the intermediate layer and the inner layer and between the outer layer and the intermediate layer.

21 Claims, 10 Drawing Sheets

U.S. PATENT DOCUMENTS

| | | | | |
|---|---|---|---|---|
| 6,042,906 | A | 3/2000 | Itoh et al. | |
| 6,261,097 | B1 * | 7/2001 | Schmutz et al. | 433/173 |
| 8,029,885 | B2 * | 10/2011 | Manabe et al. | 428/215 |
| 8,309,189 | B2 * | 11/2012 | Suzuki et al. | 428/35.7 |
| 8,377,029 | B2 * | 2/2013 | Nagao et al. | 604/403 |
| 2003/0199814 | A1 * | 10/2003 | Parsons et al. | 604/68 |
| 2006/0229583 | A1 | 10/2006 | Nagao et al. | |
| 2007/0068827 | A1 * | 3/2007 | Jemelin | 206/63.5 |
| 2008/0063825 | A1 | 3/2008 | Mori et al. | |
| 2009/0101672 | A1 | 4/2009 | Kunz | |
| 2010/0021707 | A1 * | 1/2010 | Sakagami et al. | 428/220 |
| 2010/0276321 | A1 * | 11/2010 | Nakamura et al. | 206/438 |
| 2010/0320215 | A1 * | 12/2010 | Ozaki et al. | 220/660 |
| 2011/0068037 | A1 * | 3/2011 | Ozaki et al. | 206/524.2 |
| 2011/0135223 | A1 * | 6/2011 | Suzuki et al. | 383/114 |
| 2012/0271270 | A1 * | 10/2012 | Ozaki et al. | 604/408 |

FOREIGN PATENT DOCUMENTS

| | | | |
|---|---|---|---|
| EP | 1 875 889 | A1 | 1/2008 |
| EP | 2 127 866 | A1 | 12/2009 |
| JP | 5-293159 | | 11/1993 |
| JP | 6-191589 | | 7/1994 |
| JP | 7-266517 | | 10/1995 |
| JP | 08-193149 | | 7/1996 |
| JP | 09-086570 | | 3/1997 |
| JP | 2000-178319 | | 6/2000 |
| JP | 2002-301796 | | 10/2002 |
| JP | 2004-106410 | | 4/2004 |
| JP | 2004-121824 | | 4/2004 |
| JP | U 3109486 | | 3/2005 |
| JP | 2005-230167 | | 9/2005 |
| JP | 2006-217975 | | 8/2006 |
| TW | 216768 | | 12/1993 |
| TW | 200400113 | | 1/2004 |
| TW | 200505405 | | 2/2005 |
| TW | 200626126 | | 8/2006 |
| WO | WO 03/097355 | A1 | 11/2003 |
| WO | WO-2004/093775 | A1 | 4/2004 |
| WO | WO 2005/004902 | A1 | 1/2005 |
| WO | WO 2007/071304 | A1 | 6/2007 |

OTHER PUBLICATIONS

Supplementary European Search Report dated Feb. 16, 2011 issued in corresponding EP application No. 08722164.4.

International Search Report from the Japanese Patent Office for International Application No. PCT/JP2008/054768 (Mail date: Jan. 6, 2009 ).

* cited by examiner

PLASTIC AMPULE AND COLORED PLASTIC CONTAINER

TECHNICAL FIELD

The present invention relates to a plastic ampule and to a colored plastic container made of a multilayer plastic material with thermoplasticity, and to be more detailed, relates to a plastic ampule for storing a drug solution in a sealed state and to a plastic container for storing a drug solution, which is readily decomposed or degraded by ultraviolet rays.

BACKGROUND ART

Ampules for storing a drug solution in a sealed state are recently changing from ampules made of glass to those made of plastic from standpoints of strength against impact, ease of handling, and safety.

A plastic ampule normally includes a drug solution storage part for storing a drug solution, a drug solution discharge tube in communication with the drug solution storage part and extending toward one side, and a top part closing an end at the one side of the drug solution discharge tube, and is arranged so that in a fragile part formed at the drug solution discharge tube (a thin thickness part formed along a circumferential direction), a discharge opening for discharging the drug solution is formed by tearing open (for example, twisting off or cleaving) the fragile part of the drug solution discharge tube.

Also, although a plastic ampule is conventionally formed of a medically acceptable polyolefin, such as polyethylene, polypropylene, etc., use of a cyclic olefin-based (co)polymer is being examined recently from standpoints of suppressing volatilization and scattering of a drug solution stored in the plastic ampule (in particular, the volatilization and scattering of water, which is a solvent of the drug solution, and the accompanying concentrating of the drug solution) and elution of compounding ingredients, contained in the plastic, into the drug solution.

Specifically, a plastic ampule made of a resin material having a cyclic olefin-based compound as a polymer component is described in Patent Document 1, and a plastic ampule formed of a resin with which an innermost layer contains a polycyclic olefin is described in Patent Document 2.

As a method for manufacturing a plastic ampule, a so-called blow-fill-seal (BFS) method is known in which a step of molding an ampule by blow molding, a step of filling an interior of the ampule with a drug solution, and a step of sealing the ampule are executed in a continuous manner as described in Patent Document 2, and by this BFS method, a plastic ampule can be formed in an integral manner and moreover the drug solution can be stored and sealed inside the plastic ampule in a sterile manner.

Also, with such a plastic container, imparting of a light blocking property to a plastic material forming the container for storage of a drug solution that is readily decomposed or degraded by ultraviolet rays is being examined and, for example, compounding of a pigment and compounding of an ultraviolet absorber in the plastic material are being proposed.

A colored resin composition for a transfusion solution bag formed by compounding 0.02 to 3.0 weight parts of either or both of color index pigment yellow 95 and color index pigment yellow 147 in 100 weight parts of a thermoplastic resin is described in Patent Document 3.

Also, Patent Document 4 proposes that a container for oily foods be formed from a laminate with which an ethylene-vinyl alcohol copolymer layer, containing an ultraviolet absorber, is disposed as an intermediate layer via adhesive resin layers with respect to inner and outer layers, mainly made of a polyolefin, to prevent degradation of adhesion by light rays and improve preservation of contents.

Patent Document 1: Japanese Unexamined Patent Publication No. 5-293159

Patent Document 2: Published International Application No. WO 2004/093775

Patent Document 3: Japanese Unexamined Patent Publication No. 8-193149

Patent Document 4: Japanese Unexamined Patent Publication No. 9-86570

DISCLOSURE OF THE INVENTION

Problems to be Solved by the Invention

In forming a plastic ampule by the BFS method, a cyclic olefin-based (co)polymer layer is preferably used as a layer besides an innermost layer of the ampule from a standpoint of preventing degradation of sealing property and moldability of the ampule and preferably, from a standpoint of preventing elution of a pigment, ultraviolet absorber, and other additives into the drug solution, is used as a layer at an inner side relative to a layer in which such additives are compounded. The cyclic olefin-based (co)polymer layer is thus automatically used as an intermediate layer of the plastic ampule.

However, with a plastic ampule with which an intermediate layer is formed of a cyclic olefin-based (co)polymer layer, there is a problem that when, for example, the ampule is opened, thin pieces of resin, generally referred to as "whiskers" remain at an opening formed by twisting off or cleaving, and a problem of the opening becoming deformed or damaged to make discharge of the drug solution from the plastic ampule difficult.

Also, in a case of compounding a pigment in a plastic material that forms a container, a large amount of the pigment must be compounded to adequately block wavelengths in an ultraviolet region and thus wavelengths in a visible region are also blocked, making it difficult to view contents of the plastic container.

Also, in a case of compounding an ultraviolet absorber in the plastic material to adequately block wavelengths in the ultraviolet region, a large amount of the ultraviolet absorber is compounded and thus a problem of increased cost tends to be significant and problems, such as lowering of dispersibility of the ultraviolet absorber in the plastic material and exudation (bleeding) of the ultraviolet absorber from the plastic material, may also occur.

Although increasing a thickness of the plastic material may be considered as another method for improving the light blocking property of a plastic container, in this case, the thickness of the container as a whole increases and this may damage handling properties, etc., of the plastic container. Demerits due to increased thickness tend to be exhibited significantly in cases where the plastic container is an ampule or other comparatively small container in particular.

An object of the present invention is to provide a plastic ampule capable of suppressing volatilization and scattering of a drug solution stored in the plastic ampule and elution of compounding ingredients in the plastic into the drug solution, and furthermore suppressing whisker formation and deformation and damage of an opening when the plastic ampule is opened.

Another object of the present invention is to provide a colored plastic container capable of storing, with stability, a drug solution that is readily decomposed or degraded by ultraviolet rays and yet enabling contents of the container to be viewed readily.

Means for Solving the Problems

As a result of repeating diligent examination toward achieving the above object, the present inventors found that the above issues can be resolved in an ampule made of a multilayer plastic material by setting a glass transition temperature of a cyclic olefin-based (co)polymer, used in an intermediate layer of the multilayer plastic material, to be within a predetermined range, and as a result of further examination, have come to complete the present invention.

That is, a plastic ampule according to the present invention includes a drug solution storage part for storing a drug solution, a drug solution discharge tube in communication with the drug solution storage part and extending toward one side, and a top part closing an end at the one side of the drug solution discharge tube, and with this plastic ampule, the drug solution discharge tube includes a fragile part formed to have a thin thickness along a circumferential direction, and the drug solution storage part, the drug solution discharge tube, and the top part are made of a multilayer plastic material that includes an intermediate layer, containing a cyclic olefin-based (co)polymer with a glass transition temperature of 60 to 80° C., an inner layer laminated to an inner side of the intermediate layer, and an outer layer laminated to an outer side of the intermediate layer.

By the plastic ampule according to the present invention, volatilization and scattering of the drug solution stored in the plastic ampule and elution of the compounding ingredients in the plastic into the drug solution can be suppressed because the intermediate layer of the multilayer plastic material forming the drug solution containing part, the drug solution discharge tube, and the top part contains the cyclic olefin-based (co)polymer.

Moreover, by the plastic ampule according to the present invention, the fragile part of the drug solution discharge tube can be torn open with good workability, and whisker formation and deformation and damage of an opening when the plastic ampule is opened can be suppressed.

Preferably with the plastic ampule according to the present invention, the multilayer plastic material includes adhesive layers respectively disposed between the intermediate layer and the inner layer and between the intermediate layer and the outer layer.

In this case, an adhesive property of the intermediate layer and the inner layer and an adhesive property of the intermediate layer and the outer layer can be improved.

Preferably, the plastic ampule according to the present invention further includes a tab that continues from an outer peripheral surface of the drug solution discharge tube at a top part side relative to the fragile part and protrudes to an outer side of the drug solution discharge tube or a tab that continues from an outer surface of the top part and protrudes to an outer side of the top part.

In this case, an operation of opening the plastic ampule can be performed easily because the drug solution discharge part can be twisted off or cleaved at the fragile part by holding and then twisting or bending the tab.

Preferably, the plastic ampule according to the present invention further includes reinforcing members that respectively protrude continuously from an outer peripheral surface of the drug solution discharge tube at the drug solution storage part side relative to the fragile part and an outer surface of the drug solution storage part to outer sides of the drug solution discharge tube and the drug solution storage part and are mutually connected.

In this case, rigidity between the drug solution storage part and the drug solution discharge tube is improved by the reinforcing members so that when the tab is twisted or bent, deformation of the drug solution storage part and the drug solution discharge tube can be suppressed and the fragile part of the drug solution discharge tube can be broken easily and reliably. The plastic ampule can thus be opened with significantly improved workability.

Preferably with the plastic ampule according to the present invention, a force required to tear open the fragile part is no more than 0.65N·m/mm with respect to a thickness of the multilayer plastic material at the drug solution discharge tube.

By the force required to tear open the fragile part of the drug solution discharge tube being set in the above range, the plastic ampule can be opened with significantly improved workability.

Preferably with the plastic ampule according to the present invention, each of the inner layer and the outer layer of the multilayer plastic material)

(i) contains a high-pressure polyethylene with a density of 0.900 to 0.940 g/cm$^3$, or (ii) contains a polypropylene-based resin.

In the case of (i), adjustment of the force required to tear open the fragile part is made easy and moreover, a satisfactory sensation is provided during twisting off or cleaving the fragile part.

In the case of (ii), the heat resistance of the plastic ampule can be improved.

Also, in the case of (ii), the polypropylene-based resin is preferably a mixture of polypropylene, a polypropylene elastomer, and a nucleating agent.

In this case, the inner layer and the outer layer of the multilayer plastic material can be improved in flexibility and transparency.

Preferably with the plastic ampule according to the present invention, the intermediate layer of the multilayer plastic material is made of a mixed resin of the cyclic olefin-based (co)polymer with a glass transition temperature of 60 to 80° C. and a high-pressure polyethylene with a density of 0.900 to 0.940 g/cm$^3$ or a high-density polyethylene with a density of 0.940 to 0.970 g/cm$^3$, and a content proportion of the high-pressure polyethylene with a density of 0.900 to 0.940 g/cm$^3$ or the high-density polyethylene with a density of 0.940 to 0.970 g/cm$^3$ in the mixed resin is no more than 30 weight %.

In this case, the adjustment of the force required to tear open the fragile part is made easy and moreover, the adhesive property of the intermediate layer with the inner layer and the outer layer can be improved.

Preferably with the plastic ampule according to the present invention, the outer layer of the multilayer plastic material contains either or both of (iii) a colorant and (iv) an ultraviolet absorber.

In the case of (iii) and (iv), the plastic ampule can be provided with a light blocking property as suited.

In the case of (iv), the ultraviolet absorber is preferably a benzotriazole-based ultraviolet absorber.

Also in the case of (iv), the outer layer of the multilayer plastic material preferably contains metal oxide microparticles in addition to the ultraviolet absorber.

To achieve the other object, a colored plastic container according to the present invention is formed of a thermoplastic multilayer plastic material including a colored layer containing a pigment and an ultraviolet absorber, and an inner layer laminated directly or across an intermediate layer onto one side surface of the colored layer, and with this colored plastic container, a thickness T of the colored layer is 50 to 1000 μm, a product PT of a content proportion P (weight %) of the pigment in the colored layer and the thickness T (μm) of the colored layer satisfies Formula (1) below, and a product UT of a content proportion U (weight %) of the ultraviolet absorber in the colored layer and the thickness T (μm) of the colored layer satisfies Formula (2) below when the product PT exceeds 20 and satisfies Formula (3) below when the product PT is no more than 20.

$$1 \leqq PT \leqq 150 \quad (1)$$

$$5 \leqq UT \leqq 160 \quad (2)$$

$$20 < UT \leqq 160 \quad (3)$$

By the colored plastic container according to the present invention, wavelengths in an ultraviolet region can blocked efficiently while maintaining an appropriate visibility with respect to an interior of the container. Thus by the present invention, a drug agent that is decomposed or degraded readily by ultraviolet rays can be stored with stability.

Preferably with the colored plastic container according to the present invention, the other side surface of the colored layer is an outer side surface of the thermoplastic multilayer plastic material. That is, the colored layer is preferably the outer layer of the colored plastic container.

Also, preferably in this case, a quotient U/T of the content proportion U (weight %) of the ultraviolet absorber in the colored layer divided by the thickness T (μm) of the colored layer satisfies Formula (4) below.

$$U/T \leqq 0.004 \quad (4)$$

By disposing the colored layer at the outer side surface of the thermoplastic multilayer plastic material, that is, by making the colored layer the outermost layer of the thermoplastic multilayer plastic material, the ultraviolet absorbing effect by the ultraviolet absorber can be exhibited efficiently. Also, in this case, by setting the content proportion of the ultraviolet absorber in the colored layer in the above range, exudation (bleeding) of the ultraviolet absorber from the surface of the thermoplastic multilayer plastic material can be prevented.

Preferably in the colored plastic container according to the present invention, the pigment is an azo condensation pigment, and the ultraviolet absorber is a benzotriazole-based ultraviolet absorber. In this case, the effect of blocking light rays in the ultraviolet region is good.

Also, in the colored plastic container according to the present invention, the thermoplastic multilayer plastic layer has a transmittance of no more than 5% with respect to light rays of wavelengths of 200 to 380 nm and a transmittance of no less than 40% with respect to light rays of a wavelength of 600 nm.

The colored plastic container according to the present invention preferably has a cyclic olefin polymer layer disposed between the colored layer and the inner layer. In this case, the pigment and the ultraviolet absorber contained in the colored layer can be prevented from transferring to an inner layer side and to a stored content of the colored plastic container, and inadvertent effects on the drug solution stored in the colored plastic container can be prevented.

Preferably, the colored plastic container according to the present invention is a colored plastic ampule including a drug solution storage part formed to a bottomed cylindrical shape and being for storing a drug solution, a drug solution discharge tube in communication with an open end of the drug solution storage part and extending toward one side, and a top part closing an end at the one side of the drug solution discharge tube, and the thickness of the thermoplastic multilayer plastic layer at the drug solution storage part is 300 to 1500 μm.

Also, in this case, the colored plastic container (colored plastic ampule) is formed by a blow-fill-seal (BFS) method.

Effect(s) of the Invention

By the plastic ampule according to the present invention, volatilization and scattering of the drug solution stored in the plastic ampule and elution of compounding ingredients in the plastic into the drug solution can be suppressed, and moreover, the fragile part of the drug solution discharge tube can be torn open with good workability and whisker formation and deformation and damage of the opening when the plastic ampule is opened can be suppressed.

The plastic ampule according to the present invention is thus favorable as an ampule for storing a drug solution in a sealed state and is especially favorable as a plastic ampule prepared by the BFS method.

The colored plastic container according to the present invention has an appropriate visibility with respect to the interior of the container and yet can efficiently block entry of light rays of the ultraviolet region into the interior from the exterior of the container. The colored plastic container according to the present invention is thus favorable for an application of storing a drug solution that is readily decomposed or degraded by ultraviolet rays.

DESCRIPTION OF REFERENCE NUMERALS

10 plastic ampule, 11 drug solution storage part, drug solution discharge tube, 13 top part, 14 fragile part, intermediate layer, 19 inner layer, 20 outer layer, 21 adhesive layer, 22 adhesive layer, 28 tab, 31 reinforcing member, 101 colored layer, 102 cyclic olefin polymer layer, 104 intermediate layer, 110 colored plastic ampule, 111 drug solution storage part, 112 drug solution discharge tube, 113 top part Preferred Embodiment(S) of the Invention A preferred embodiment of a plastic ampule according to the present invention shall now be described in detail with reference to the attached drawings.

Figure 1:
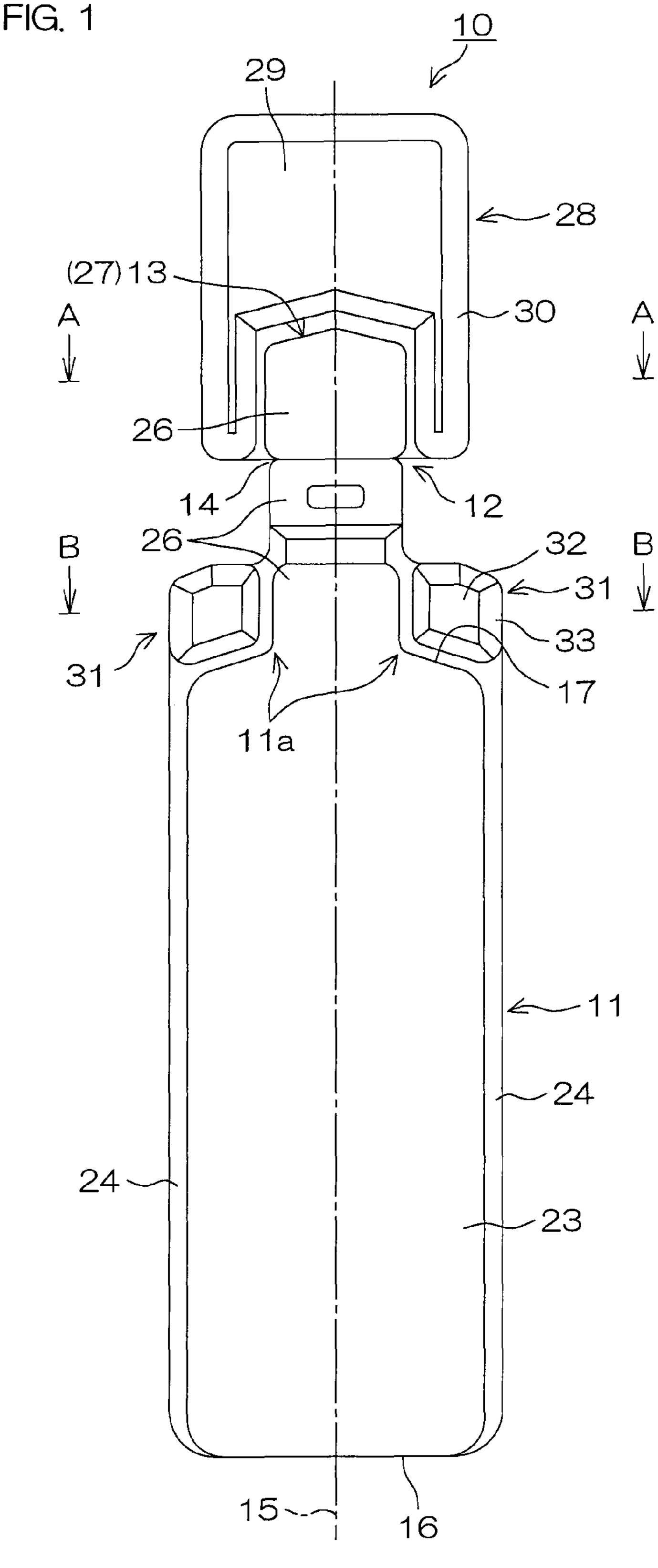
FIG. 1 is a front view of an embodiment of a plastic ampule according to the present invention.
Figure 2:
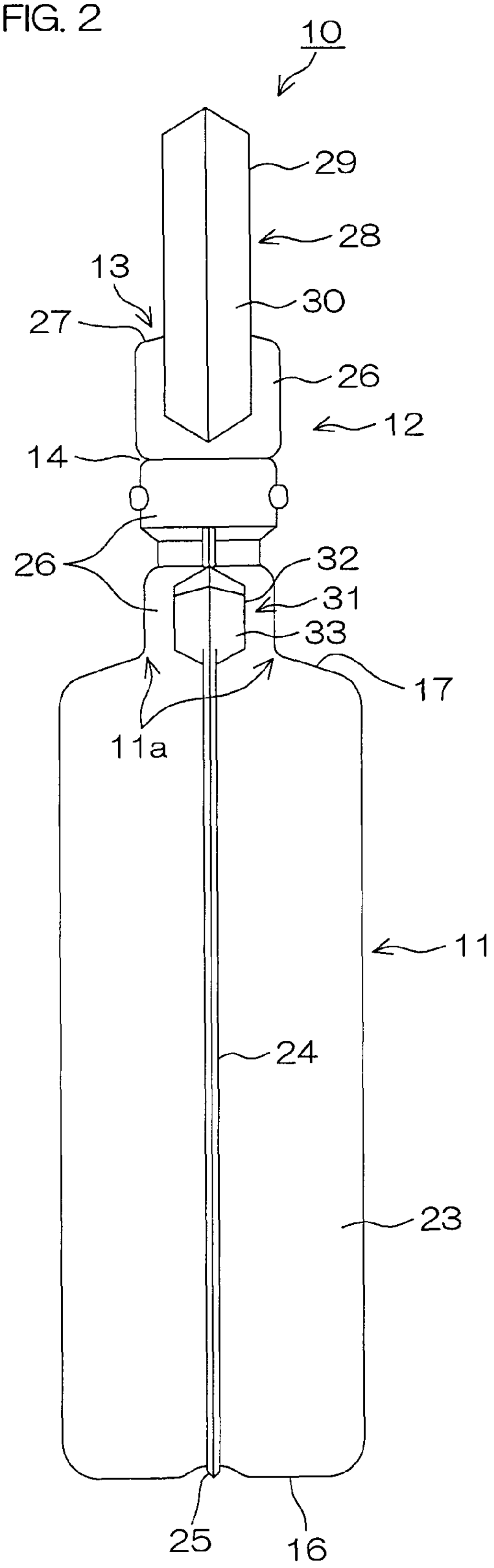
FIG. 2 is a left side view of the plastic ampule shown in FIG. 1.
Figure 3:
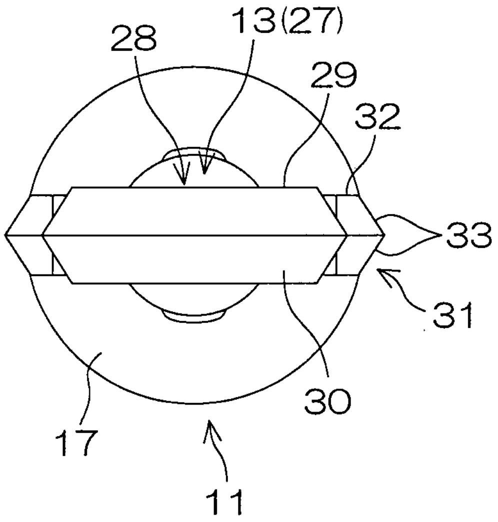
FIG. 3 is a plan view of the plastic ampule shown in FIG. 1.
Figure 4:
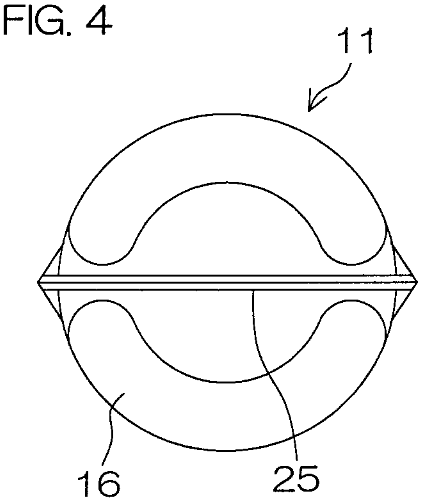
FIG. 4 is a bottom view of the plastic ampule shown in FIG. 1.
Figure 5:
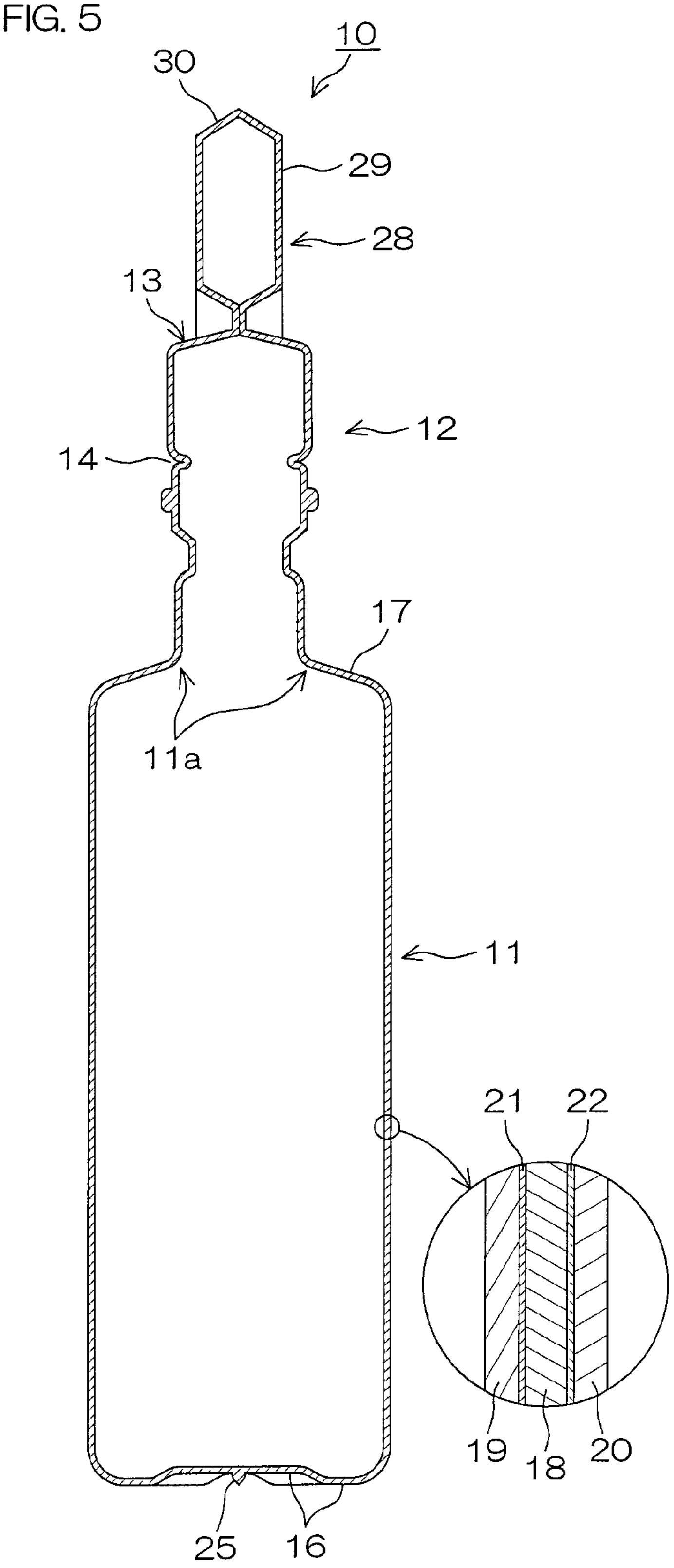
FIG. 5 is a left side sectional view of the plastic ampule shown in FIG. 1.
Figure 6:
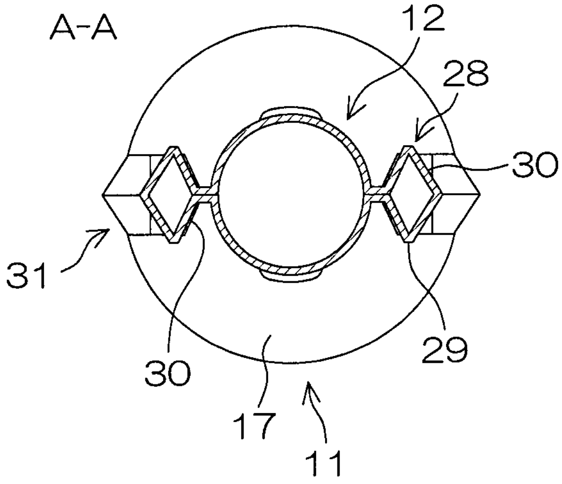
FIG. 6 is a sectional view taken along line A-A of the plastic ampule shown in FIG. 1.
Figure 7:
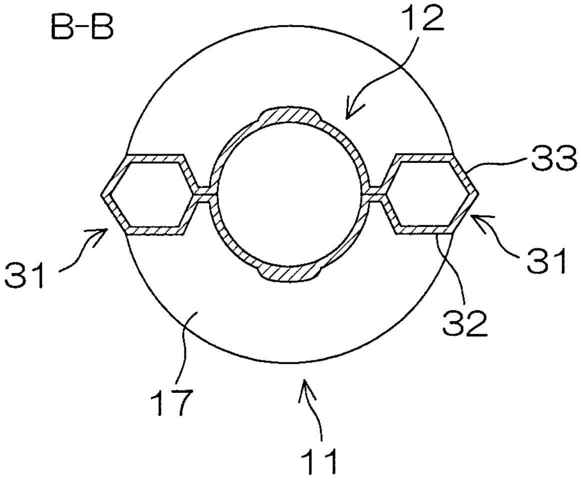
FIG. 7 is a sectional view taken along line B-B of the plastic ampule shown in FIG. 1.

FIG. 1 is a front view of an embodiment of a plastic ampule according to the present invention. For the plastic ampule 10 shown in FIG. 1, FIG. 2 is a left side view, FIG. 3 is a plan view, FIG. 4 is a bottom view, FIG. 5 is a left side sectional view, FIG. 6 is a sectional view taken along line A-A, and FIG. 7 is a sectional view taken along line B-B. With the plastic ampule 10 shown in FIG. 1, a rear view appears the same as the front view, and a right side view appears the same as the left side view.

As shown in FIG. 1 and FIG. 2, the plastic ampule 10 includes a drug solution storage part 11 formed to a bottomed cylindrical shape and being for storing a drug solution, a drug solution discharge tube 12 in communication with an open end 11*a* of the drug solution storage part 11 and extending toward one side, and a top part 13 closing an end at the one side of the drug solution discharge tube 12, and the drug solution discharge tube 12 includes a fragile part 14 formed to have a thin thickness along a circumferential direction.

The drug solution storage part 11 has the open end 11*a* formed at an end at the one side opposite a bottom part 16 in a longitudinal direction extending along a central axis 15 of the drug solution storage part 11, and has a shoulder part 17, which decreases in diameter from the bottom part 16 side toward the open end 11*a* side (toward the one side), in a vicinity of the open end 11*a*.

Although as shown in FIG. 3 and FIG. 4, a cross-sectional shape of the drug solution storage part 11 is formed to be circular in plan view or bottom view, the cross-sectional shape of the drug solution storage part 11 is not restricted thereto and may be formed, for example, to be elliptical.

Referring again to FIG. 1 and FIG. 2, the drug solution discharge tube 12 is formed to continue from the open end 11*a* of the drug solution storage part 11 and extend along an axial direction of the central axis 15 of the drug solution storage part 11 with the same axis as the central axis 15 as its central axis. At the end at the one side of the drug solution discharge tube 12 (that is, the end of the drug solution discharge tube 12 at the side opposite the open end 11*a* side of the drug solution storage part 11) is formed the top part 13 that continues from the end at the one side and seals the drug solution discharge tube 12.

The drug solution discharge tube 12 preferably has an inner diameter that fits with a nozzle of a syringe for suctioning the drug solution inside the drug solution storage part 11 when the nozzle is inserted so that the nozzle is fixed in a stable state, and preferably has an adequate length in the axial direction of the drug solution discharge tube 12 between the drug solution storage part 11 and the top part 13.

The drug solution storage part 11, the drug solution discharge tube 12, and the top part 13 are mutually continuous, integral, and form a closed region for storing and sealing the drug solution.

Also, the drug solution discharge tube 12 has the fragile part 14 formed to have the thin thickness along the circumferential direction of the drug solution discharge tube 12 at a substantially middle portion between the open end 11*a* of the drug solution storage part 11 and the end at the one side of the drug solution discharge tube 12 (see FIG. 5).

The fragile part 14 can thereby be twisted off or cleaved and torn open readily by holding the drug solution storage part 11 and the top part 13 side of the drug solution discharge tube 12 and twisting or bending these parts with respect to each other. The plastic ampule 10 can thereby be opened.

Also, the drug solution discharge tube 12 is thereby opened and a nozzle of an unillustrated syringe can be inserted into an opening thus formed to collect the drug solution stored in the drug solution storage part 11. The syringe is used, for example, by inserting its nozzle, without an injection needle being attached to a tip of the nozzle, into the opening of the drug solution discharge tube 12 and suctioning the drug solution stored inside the drug solution storage part 11.

Referring to FIG. 5, the drug solution housing part 11, the drug solution discharge tube 12, and the top part 13 are formed of a multilayer plastic material that includes, for example, an intermediate layer 18 containing a cyclic olefin-based (co)polymer with a glass transition temperature of 60 to 80° C., an inner layer 19 laminated to an inner side of the plastic ampule 10 with respect to the intermediate layer 18, an outer layer 20 laminated to an outer side of the plastic ampule 10, an adhesive layer 21 disposed between the intermediate layer 18 and the inner layer 19, and an adhesive layer 22 disposed between the intermediate layer 18 and the outer layer 20.

The adhesive layer 21 disposed between the intermediate layer 18 and the inner layer 19 and the adhesive layer 22 disposed between the intermediate layer 18 and the outer layer 20 are both arbitrary layers, and the adhesive layers 21 and 22 may be omitted to dispose the inner layer 19 and the outer layer 20 directly on respective surfaces of an inner side surface and an outer side surface of the plastic ampule 10 with respect to the intermediate layer 18.

As examples of the cyclic olefin-based (co)polymer with the glass transition temperature of 60 to 80° C. used to form the intermediate layer 18, a copolymer of ethylene and a dicyclopentadiene, a copolymer of ethylene and a norbornene-based compound, a ring-opened polymer of a cyclopentadiene derivative, a ring-opened copolymer of a plurality of cyclopentadiene derivatives, and a hydrogenate of any of the above can be cited. Such a cyclic olefin-based (co)polymer with the glass transition temperature of 60 to 80° C. may be used solitarily or two or more types of the (co)polymer may be used upon mixing. Among the above, a hydrogenate of a copolymer of ethylene and a norbornene-based compound and a hydrogenate of a ring-opened (co)polymer of one or more cyclopentadiene derivatives can be cited as preferable examples of the cyclic olefin-based (co)polymer.

By using the above-described cyclic olefin-based (co)polymer to form the intermediate layer 18, the plastic ampule can be improved further in strength and water permeation preventing ability, and moreover, the plastic ampule can be imparted with a gas permeation preventing ability.

As specific examples of the cyclic olefin-based (co)polymer, a copolymer having repeating units indicated by General Formula (A) and repeating units indicated by General Formula (A'), and a polymer having repeating units indicated by General Formula (B) can be cited.

[Chemical Formula 1]

(A)

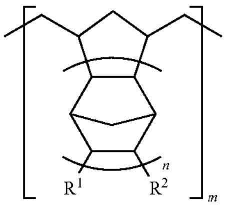

(A')

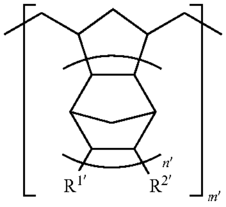

[Chemical Formula 2]

(B)

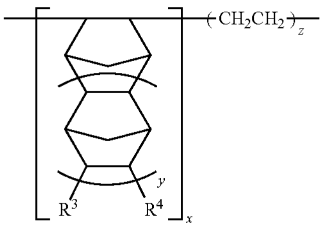

(In Formula (A), Formula (A'), and Formula (B), $R^1$, $R^{1'}$, $R^2$, $R^{2'}$, $R^3$ and $R^4$ are the same or different, with each indicating hydrogen, a hydrocarbon residual, or a polar group. $R^1$ and $R^2$, $R^{1'}$ and $R^{2'}$, and $R^3$ and $R^4$ may respectively be bonded mutually to form a ring. m, m', x, and z are the same or different with each indicating an integer no less than 1, and n, n', and y are the same or different with each indicating 0 or an integer no less than 1.)

As an example of the hydrocarbon residual, an alkyl group can be cited, an alkyl group with 1 to 6 carbons can be cited as a preferable example, and an alkyl group with 1 to 4 carbons can be cited as a more preferable example.

As examples of the polar group, a halogen atom (for example, a fluorine atom, chlorine atom, bromine atom, iodine atom, etc.), an ester, a nitrile, a pyridyl, etc., can be cited.

A polymer having the repeating units indicated by the General Formulae (A) and (A') is obtained by polymerizing one type or two or more types of monomer by a known ring-opening polymerization reaction or using a conventional method to hydrogenate a ring-opened polymer thus obtained.

Such a polymer can be obtained, for example, as a product of the trade name "Zeonoa (registered trademark)," made by Zeon Corp., or a product of the trade name "ARTON (registered trademark)," made by JSR Corp.

A polymer having the repeating units indicated by the General Formula (B) is obtained by performing either or both of an addition polymerization by a known method of one or two or more types of a norbornene-based monomer and ethylene as monomers and a hydrogenation by a conventional method of a product of the addition polymerization.

Such a polymer can be obtained, for example, as a product of the trade name "APEL (registered trademark)," made by Mitsui Chemicals, Inc., or a product of the trade name "Topas (registered trademark)," made by Ticona GmbH.

The hydrogenates of the polymers having the repeating units indicated by the General Formulae (A) and (A') are saturated polymers in all cases and are thus excellent in gas blocking property and water blocking property as well as in heat resistance, transparency, and stability.

The glass transition temperature (Tg) of the cyclic olefin co(polymer) is a midpoint glass transition temperature ($T_{mg}$) measured by input compensation differential scanning calorimetry (input compensation DSC) described in JIS K7121$_{-1987}$ "Testing Methods for Transition Temperatures of Plastics," and the Tg of the cyclic olefin-based (co)polymer used in forming the intermediate layer 18 is set in the range of 60 to 80° C. as mentioned above and preferably in the range of 65 to 80° C.

When the Tg of the cyclic olefin-based (co)polymer exceeds 80° C., a problem that fine pieces of resin, called "whiskers," remain on the opening formed by tearing open the fragile part 14 occurs. Also, when the Tg of the cyclic olefin-based (co)polymer exceeds 80° C., a force required to tear open the fragile part 14 by twisting off or cleaving becomes large and the plastic ampule 10 becomes difficult to open. Oppositely when the Tg of the cyclic olefin-based (co) polymer falls below 60° C., a water vapor barrier property and an effect of preventing transfer of resin additives, etc., into a contained solution, which are required of the intermediate layer 18, degrade and the desired objects of the present invention cannot be obtained.

Although a melt flow rate (MFR) of the cyclic olefin-based (co)polymer is not restricted in particular, it is preferably 4 to 30 g/10 minutes (260° C.) from standpoints of moldability, mechanical characteristics, etc., of the plastic ampule.

Although a molecular weight of the cyclic olefin-based (co)polymer is not restricted in particular, a number average molecular weight <Mn> is preferably 10,000 to 100,000 and more preferably 20,000 to 50,000. The average molecular weight is determined, for example, as a styrene equivalent value by gel permeation chromatography (GPC) analysis using cyclohexane as a solvent.

Although the intermediate layer 18 may be formed solely of the cyclic olefin-based (co)polymer with the glass transition temperature (Tg) of 60 to 80° C., it may also be formed of a mixed resin including the cyclic olefin-based (co)polymer with the glass transition temperature of 60 to 80° C. and polyethylene.

As a preferable example of such a mixed resin, a mixed resin including the cyclic olefin-based (co)polymer with the glass transition temperature of 60 to 80° C. and a high-pressure polyethylene with a density of 0.900 to 0.940 g/$cm^3$ (more preferably, a density of 0.920 to 0.930 g/$cm^3$) or a high-density polyethylene with a density of 0.940 to 0.970 g/$cm^3$ can be cited.

The high-pressure polyethylene is a branched-chain polyethylene manufactured by a high pressure method. Meanwhile, the high-density polyethylene is a straight-chain polyethylene manufactured by a medium or low pressure method, and the high-density polyethylene may, for example, be a homopolymer of ethylene or may be a copolymer of ethylene and an α-olefin such as propene, butene-1, pentene-1, hexene-1,4-methylpentene-1, octene-1, decene-1, etc.

By using the above-described mixed resin as the resin forming the intermediate layer 18, the force required to tear open the fragile part 14 by twisting off or cleaving can be set readily, and an adhesive property of the intermediate layer 18 with the inner layer 19 and the outer layer 20 that are adjacent the intermediate layer 18 is improved. Further, mixing of the high-density polyethylene with the cyclic olefin-based (co)

polymer is favorable in that the transparency of the mixed resin can be maintained adequately.

In the mixed resin, the content proportion of the high-pressure polyethylene with the density of 0.900 to 0.940 g/cm$^3$ (more preferably, a density of 0.920 to 0.930 g/cm$^3$) or the high-density polyethylene with the density of 0.940 to 0.970 g/cm$^3$ is preferably no more than 30 weight %, more preferably 5 to 30 weight %, and especially preferably 5 to 25 weight % of the entire mixed resin. When the mixing proportion of the high-pressure polyethylene or the high-density polyethylene in the mixed resin exceeds the above range, the above-described performance required of the cyclic olefin-based (co)polymer may not be adequate.

A polyolefin can be cited as an example of the resin forming the inner layer 19 and the outer layer 20.

The polyolefin is not restricted in particular and various polyolefins that are conventionally used in medical plastic containers can be cited as examples and among these, polyethylene-based resins and polypropylene-based resins can be cited as preferable examples. A polypropylene-based resin is favorably used in a case where heat resistance of the medical plastic container is stressed.

As examples of polyethylene-based resins, homopolymers, such as a high-pressure (branched) low-density polyethylene (HP-LDPE), straight-chain low-density polyethylene (LLDPE), medium-density polyethylene (MDPE), high-density polyethylene (HDPE), etc., and polyethylene-based copolymers can be cited. The same α-olefins cited above can be cited as examples of the comonomer besides ethylene in the polyethylene-based copolymer. Also, in the polyethylene-based copolymer, the content proportion of the comonomer besides ethylene is preferably no more than 20 mole % and more preferably 3 to 20 mole %.

Although properties of the polyethylene-based resin are not restricted in particular, from standpoints of moldability with the intermediate layer 18 that contains the cyclic olefin-based (co)polymer, ease of setting of the force required to tear open the fragile part 14 by twisting off or cleaving, mechanical characteristics of the plastic ampule, etc., a polyethylene-based resin of comparatively low density, specifically, a high-pressure polyethylene with a density in a range of 0.900 to 0.940 g/cm$^3$ and more preferably 0.920 to 0.930 g/cm$^3$ is favorably selected. As an example of the high-pressure polyethylene, the same resin as that cited for forming the intermediate layer 18 can be cited.

Although the melt flow rate (MFR) of the polyethylene-based resin is not restricted in particular, it is preferably 0.2 to 20 g/10 minutes (190° C.) from standpoints of the moldability with the intermediate layer 18 that contains the cyclic olefin-based (co)polymer, mechanical characteristics of the plastic ampule, etc.

Meanwhile, as examples of the polypropylene-based resin, crystalline homopolymers, such as isotactic polypropylene, syndiotactic polypropylene, etc., and crystalline copolymers containing a small amount of a commoner can be cited.

As examples of the comonomer besides propylene in the crystalline copolymer, α-olefins, such as ethylene, butene-1, pentene-1, hexene-1,4-methylpentene-1, octene-1, decene-1, etc., can be cited. The content proportion of the comonomer besides propylene in the crystalline copolymer is preferably no more than 30 mole %, more preferably 2 to 30 mole %, and especially preferably 3 to 25 mole %.

Also, a thermoplastic elastomer is used favorably for the purpose of imparting flexibility to the polypropylene-based resin. In particular, a polypropylene elastomer manufactured using a metallocene catalyst and having a density of 0.860 to 0.870 g/cm$^3$ and a glass transition temperature (Tg) of no more than −10° C. has all of heat resistance, transparency, and flexibility and is thus favorable for the present invention. For example, a product of the trade name "NOTIO," made by Mitsui Chemicals, Inc., is available as such a polypropylene elastomer.

As other examples of the polypropylene elastomer, low-crystallinity polypropylene copolymers (for example, a product of the trade name "Toughmer (registered trademark)" X Series, etc., made by Mitsui Chemicals, Inc.) can be cited. A compounding proportion of such a polypropylene elastomer is preferably 10 to 40 weight % with respect to the total amount of the resin forming the inner layer 19 or the outer layer 20.

Although the melt flow rate (MFR) of the polypropylene-based resin is not restricted in particular, it is preferably 0.2 to 20 g/10 minutes (230° C.) from standpoints of the moldability with the intermediate layer 18 that contains the cyclic olefin-based (co)polymer, mechanical characteristics of the plastic ampule, etc.

Although the inner layer 19 and the outer layer 20 may be formed, for example, from just the polyethylene-based resin or the polypropylene-based resin, these may also be formed, for example, from a mixture of polypropylene, a polypropylene elastomer, and a nucleating agent. In this case, the transparency of the inner layer 19 and the outer layer 20 can be improved.

As examples of the nucleating agent, phosphate-based nucleating agents, such as sodium 2,2'-methylene-bis-(4,6-di-t-butylphenyl)phosphate (NA-11), hydroxyaluminum-bis [2,2'-methylene-bis-(4,6-di-t-butylphenyl)phosphate] (NA-21), etc., can be cited.

Each of the inner layer 19 and the outer layer 20 is not restricted to being a single layer and may, for example, be a laminate of layers formed of mutually different resins selected from among the abovementioned resins.

Also, the adhesive layers 21 and 22 may respectively be disposed as a layer between the intermediate layer 28 and the inner layer 19 and a layer between the intermediate layer 18 and the outer layer 20.

As examples of the resin forming the adhesive layers 21 and 22, LLDPE (in particular, LLDPE polymerized using a metallocene catalyst or other single-site catalyst), a polyethylene-based elastomer, and a mixed resin of the above can be cited. As other examples of the resin forming the adhesive layers, an unsaturated carboxylic acid-modified polyethylene, an ethylene-acrylic acid copolymer, an ethylene-vinyl acetate copolymer, etc., which are known as adhesive resins, can be cited.

The thickness of each of the adhesive layers 21 and 22 is not restricted in particular and suffices to be a thickness adequate for adhesion of the adjacent layers (the intermediate layer 18 and the inner layer 19 or the intermediate layer 18 and the outer layer 20). Specifically, the thickness is preferably approximately 2 to 10% of the thickness of an adjacent layer.

Further, for example, a colorant, an ultraviolet absorber, etc., may be compounded in the outer layer 20.

The colorant is a component that is compounded for a purpose of lowering light transmittance of the plastic ampule to prevent photodegradation of the drug solution stored in the plastic ampule or a purpose of imparting design quality to the plastic ampule, and as specific examples, a yellow pigment, such as C. I. pigment yellow 95, C. I. pigment yellow 147, C. I. pigment yellow 180, C. I. pigment yellow 181, etc., a red pigment, such as C. I. pigment red 220, C. I. pigment red 177, etc., a blue pigment, such as C. I. pigment blue 60, etc., can be cited. Such a pigment may be used solitarily or two or more types may be used upon mixing.

A compounding amount of the colorant may be set as suited according to the thickness of the resin forming the outer layer 20, a degree of light blocking property required of the plastic ampule, etc., and is not restricted in particular, and for example, is preferably 0.01 to 0.4 weight % in the resin forming the outer layer 20.

The ultraviolet absorber is a component that is compounded for a purpose of lowering an ultraviolet transmittance of the plastic ampule to prevent degradation of the drug solution contained in the plastic ampule by ultraviolet rays, and as specific examples, benzotriazole-based ultraviolet absorbers, such as 2-(2'-hydroxy-5'-methylphenol)benzotriazole (product of the trade name "Tinuvin (registered trademark) P," made by Ciba Specialty Chemicals Inc.), 2-(2'-hydroxy-3',5'-bis(methylbenzyl)phenol) benzotriazole (product of the trade name "Tinuvin (registered trademark) 234," made by the same company), 2-(2'-hydroxy-3'-tert-butyl-5'-methylphenol)-5-chlorobenzo triazole (product of the trade name "Tinuvin (registered trademark) 326," made by the same company), 2-(2'-hydroxy-3',5'-di-tert-butylphenol)-5-chlorobenzotriazole (product of the trade name "Tinuvin (registered trademark) 327," made by the same company), 2-(2'-hydroxy-3',5'-di-tert-amylphenol)benzotriazole (product of the trade name "Tinuvin (registered trademark) 328," made by the same company), 2-(2'-hydroxy-5'-tetramethylbutylphenol)benzotriazole (product of the trade name "Tinuvin (registered trademark) 329," made by the same company), etc., can be cited.

The compounding amount of the ultraviolet absorber may be set as suited according to the thickness of the resin forming the outer layer 20, a degree of ultraviolet blocking property required of the plastic ampule, etc., and is not restricted in particular, and for example, is preferably 0.01 to 0.4 weight % in the resin forming the outer layer 20.

In the case where an ultraviolet absorber is compounded in the resin forming the outer layer 20, it is preferable to further compound metal oxide microparticles from standpoints of improving an efficiency of ultraviolet absorption by the ultraviolet absorber and reducing a usage amount of the ultraviolet absorber.

As examples of the metal oxide of the metal oxide microparticles, titanium oxide, zinc oxide, iron oxide, cerium oxide, magnesium oxide, etc., can be cited.

Although an average particle diameter of the metal oxide microparticles is not restricted in particular, it is preferably no more than 50 nm and more preferably no more than 30 nm from a standpoint of maintaining the transparency of the plastic ampule.

The compounding amount of the metal oxide microparticles may be set as suited according to the type and compounding amount of the ultraviolet absorber used, the thickness of the resin forming the outer layer 20, the transparency and the degree of ultraviolet blocking property required of the plastic ampule, etc., and is not restricted in particular, and for example, is preferably 0.01 to 0.4 weight % in the resin forming the outer layer 20.

Although the combination of the ultraviolet absorber and the metal oxide microparticles is not restricted in particular, a combination of 2-(2'-hydroxy-3'-tert-butyl-5'-methylphenol)-5-chlorobenzo triazole (the abovementioned product of the trade name "Tinuvin (registered trademark) 326") and zinc oxide microparticles can be cited as a preferable example.

With each of the intermediate layer 18, the inner layer 19, and the outer layer 20, the thickness is set within a range of 10 to 50% of the entirety of the layers formed from the multilayer plastic material, and the proportions of the thicknesses of the respective layers may be set as suited according to the type and storage amount of the drug solution stored in the plastic ampule, etc.

The thickness of the multilayer plastic material may be set as suited according to usage of the plastic ampule 10, the type and storage amount of the drug solution stored in the plastic ampule 10, etc., and is not restricted in particular and, for example, is preferably 300 to 1500 μm and more preferably 400 to 1200 μm at the drug solution storage part 11. The thickness of the multilayer plastic material may be the same or may differ respectively at the drug solution storage part 11, the drug solution discharge tube 12, and the top part 13.

In regard to the multilayer plastic material, the force required to tear open (twist open or cleave) the fragile part 14, that is, the torque required to tear open the entire fragile part 14 is preferably set to no more than 0.40N·m and more preferably to 0.05 to 0.40N·m from a standpoint of operability in the process of opening the plastic ampule 10.

Also, the force required to tear open the fragile part 14 is preferably no more than 0.65N·m/mm and more preferably 0.05 to 0.65N·m/mm with respect to the thickness of the multilayer plastic material at the drug solution discharge tube 12. By the force required to tear open the fragile part 14 (the force per unit length of thickness of the multilayer plastic material) being set within the above range at a portion of the drug solution discharge tube 12, which is adjacent to the fragile part 14 and at which the thickness of the multilayer plastic material is substantially uniform, the fragile part 14 can be torn open with good operability.

The force required to tear open the fragile part 14 may be adjusted as suited by the types of resins of the respective layers forming the multilayer plastic material. In particular, from a standpoint of setting the force required to tear open the fragile part 14 to an appropriate value, the thickness of the intermediate layer made of the cyclic olefin (co)polymer is preferably set to 25 to 45% and more preferably to 30 to 40% of the thickness of the multilayer plastic material as a whole.

As shown in FIG. 1 and FIG. 2, the drug solution storage part 11 has, on an outer peripheral surface 23 thereof, a rib 24 extending along an axial direction of the central axis 15 and protruding outward in radial directions from the outer peripheral surface 23 of the drug solution storage part 11 at positions opposing each other across the central axis 15 of the drug solution storage part 11. Also, the drug solution storage part 11 has, on the bottom part 16 thereof, a rib 25 protruding outward from the bottom part 16, and the rib 24 on the outer peripheral surface 23 and the rib 25 on the bottom part 16 are mutually continuous.

The two ribs 24 and 25 that are mutually continuous are formed due to a manufacturing method of the plastic ampule 10 to be described below. By the ribs 24 and 25 being formed on the outer peripheral surface 23 of the drug solution storage part 11, the drug solution storage part 11 is imparted with rigidity and shape maintenance of the drug solution storage part 11 is achieved.

As shown in FIG. 1 and FIG. 2, on an outer peripheral surface 26 of the drug solution discharge tube 12 is provided a tab 28 that protrudes to an outer side of the drug solution discharge tube 12 in continuation from a portion of the drug solution discharge tube 12 at a top part 13 side relative to the fragile part 14 and protrudes to an outer side of the top part 13 in continuation from an outer surface 27 of the top part 13.

By the tab 28 thus being formed continuously between the top part 13 side relative to the fragile part 14 of the drug solution discharge tube 12 and the top part 13, the drug solution storage part 11 and the drug solution discharge tube 12 are made unlikely to deform when the drug solution storage part 11 and the top part 13 side of the drug solution discharge tube 12 are held and twisted or bent with respect to each other. Also, the operation of opening the plastic ampule 10 by twisting off or cleaving the fragile part 14 of the drug solution discharge tube 12 can thereby be performed easily and yet reliably.

The tab 28 includes a flat part 29 and a chamfered part 30 formed at a periphery of the flat part 29, and an interior of the tab 28 forms a hollow, thick portion (see FIG. 6). The rigidity of the tab 28 itself is thereby maintained, and deformation of the tab 28 when the tab 28 is held to open the plastic ampule 10 can be suppressed.

Also, as shown in FIG. 1 and FIG. 2, reinforcing members 31 that respectively protrude to outer sides of the drug solution discharge tube 12 and the drug solution storage part 11 and are mutually connected are provided at the outer peripheral surface 23 of the drug solution storage part 11 at the shoulder part 17 and the outer peripheral surface 26 of the drug solution discharge tube 12 at the drug solution storage part 11 side relative to the fragile part 14.

By the reinforcing members 31 being formed continuously so as to span across the portion of the drug solution discharge tube 12 at the drug solution storage part 11 side relative to the fragile part 14 and the shoulder part 17 of the drug solution storage part 11, the rigidity between the drug solution storage part 11 and the drug solution discharge tube 12 is improved significantly.

The drug solution discharge tube 12 that protrudes from the drug solution storage part 11 is thereby made unlikely to break, for example, during transport and handling of the plastic ampule 10.

Also, the opening operation of the plastic ampule 10 can be performed easily and yet reliably because fingers can be set easily on the reinforcing members 31 in the process of pinching the tab 28 and twisting off or cleaving and a reliable spin preventing action is also provided.

Each reinforcing member 31 includes a flat part 32 and a chamfered part 33 formed at a periphery of the flat part 32, and an interior of the tab 28 forms a hollow, thick portion (see FIG. 7). The rigidity of each reinforcing member 31 itself is thereby maintained to further improve the reinforcing effect, and the deformation of the reinforcing members 31 can be suppressed when the reinforcing members 31 are held to open the plastic ampule 10. Moreover, good contact with the reinforcing members 31 can be made with the fingers when the tab 28 is twisted.

The reinforcing members 31 are preferably formed along the same plane as the tab 28 as shown in FIG. 2. In this case, a slim outer appearance is obtained, the plastic ampule 10 is thereby made easy to store, and fingers can be set readily on the reinforcing members 31 when twisting the tab 28. The reinforcing members 31 may instead be formed in directions orthogonal to the tab 28.

The tab 28 and the reinforcing members 31 can be molded along with the respective parts of the drug solution storage part 11, the drug solution discharge tube 12, and the top part 13 during manufacture of the plastic ampule 10.

The plastic ampule 10 can be manufactured, for example, by a molding method that combines a so-called blow-fill-seal method, described for example in Patent Document 2, and a multilayer blow molding method:

Specifically, first, the multilayer plastic material is extrusion molded to prepare a parison with a multilayer structure in which the inner layer 19, the adhesive layer 21, the intermediate layer 18, the adhesive layer 22, and the outer layer 20 are mutually fused and laminated in that order from the inner side. The multilayer parison thus obtained is then sandwiched in a split mold and the respective parts of the drug solution storage part 11, the drug solution discharge tube 12, and the reinforcing members 31 are formed (blowing step), the interior of the drug solution storage part 11 is filled with the drug solution (filling step), and the top part 13 and the tab 28 are formed by further sandwiching with a split mold to form a closed region made up of the drug solution storage part 11, the drug solution discharge tube 12, and the top part 13 (sealing step) and thereby obtain the sealed plastic ampule 10 filled with the drug solution.

The two ribs 24 and 25 are formed along mating surfaces of the split mold when the parison is sandwiched by the split mold.

By the above method, the molding of the plastic ampule, the filling with the drug solution, and the sealing of the ampule are all performed in a continuous manner, and thus the molded product (plastic ampule 10) with a predetermined amount of the drug solution (not shown) filled in a sealed state in the drug solution storage part 11 (and the drug solution discharge tube 12) can be manufactured at low cost under excellent safety and sanitation conditions.

The parison with the multilayer structure can be prepared according to a conventional method for multilayer blow molding. The extruder, die shape, molding conditions of the parison with the multilayer structure, etc., are not restricted in particular, and these may be set as suited in accordance with the conventional method for multilayer blow molding.

Also, the manufacture of the plastic ampule by the blow-fill-seal method using the parison with the multilayer structure can be carried out in the same manner as in manufacture of a plastic ampule by the BFS method using a parison with a single layer structure with the exception of the difference in the layer structure of the parison (differences in the number of extruders and the structures of the dies for forming the parison). The respective layers of the multilayer film may be mutually fused and laminated as mentioned above or may be mutually adhered by interposing layers made of the adhesive resin between the respective layers.

The plastic ampule according to the present invention can be used widely, for example, in medical applications.

A preferred embodiment of a colored plastic container according to the present invention shall now be described in detail with reference to the attached drawings.

The colored plastic container according to the present invention is formed of a thermoplastic multilayer plastic material that includes a colored layer containing a pigment and an ultraviolet absorber, and an inner layer laminated directly or across an intermediate layer onto one side surface of the colored layer.

Figure 8:
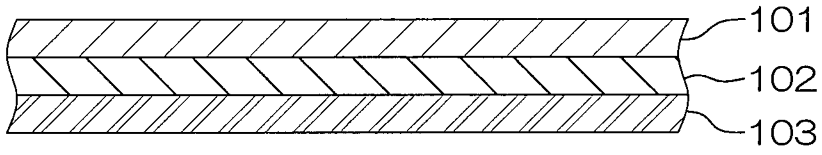
FIG. 8 is a sectional view of an example of a layer arrangement of a thermoplastic multilayer plastic material that forms a colored plastic container.
Figure 9:
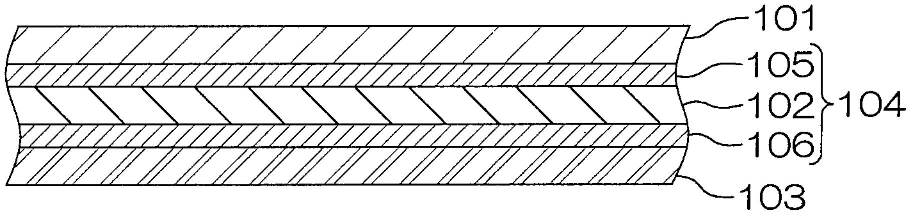
FIG. 9 is a sectional view of another example of a layer arrangement of a thermoplastic multilayer plastic material that forms a colored plastic container.
Figure 10:
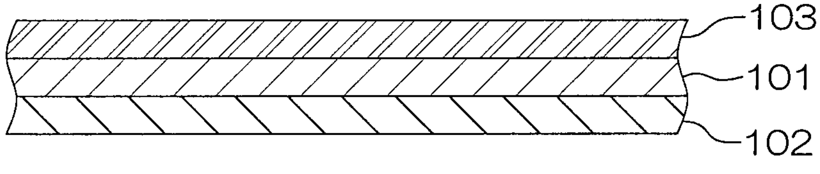
FIG. 10 is a sectional view of yet another example of a layer arrangement of a thermoplastic multilayer plastic material that forms a colored plastic container.

FIG. 8 is a sectional view of an example of a layer arrangement of a thermoplastic multilayer plastic material that forms a colored plastic container, and FIG. 9 and FIG. 10 are respectively sectional views of other examples of a layer arrangement of a thermoplastic multilayer plastic material. In the description that follows, portions that are the same or are of the same type shall be provided with the same symbol throughout the plurality of layer arrangement examples.

The thermoplastic multilayer plastic material shown in FIG. 8 includes a colored layer 101 containing a pigment and an ultraviolet absorber, a cyclic olefin polymer layer 102 laminated onto one side surface of the colored layer 101, and a polyolefin layer 103 laminated onto a surface of the cyclic olefin polymer layer 102 at the opposite side of the colored layer 101. In the thermoplastic multilayer plastic material, the colored layer 101 is a layer forming an outer layer of the colored plastic container, the cyclic olefin polymer layer 102 is a layer forming an intermediate layer of the colored plastic container, and the polyolefin layer 103 is a layer forming an inner layer of the colored plastic container.

The cyclic olefin polymer layer 102 is a layer disposed to prevent the pigment and the ultraviolet absorber contained in the color layer from transferring into a content stored in the colored plastic container and is an arbitrary layer in the thermoplastic multilayer plastic material forming the colored plastic container according to the present invention.

The thermoplastic multilayer plastic material shown in FIG. 9 includes the colored layer 101 containing the pigment and the ultraviolet absorber, an intermediate layer 104 with a three-layer structure laminated onto one side surface of the colored layer 101, and the polyolefin layer 103 laminated onto a surface of the intermediate layer 104 at the opposite side of the colored layer 101. The intermediate layer 104 includes the cyclic olefin polymer layer 102 and a total of two polyolefin layers 105 and 106 respectively laminated by one layer each onto one side surface and the other side surface of the cyclic olefin polymer layer 102. In the thermoplastic multilayer plastic material, the colored layer 101 is the layer forming the outer layer of the colored plastic container, and the polyolefin layer 103 is the layer forming the inner layer of the colored plastic container.

The thermoplastic multilayer plastic material shown in FIG. 10 includes the polyolefin layer 103, the colored layer 101 containing the pigment and the ultraviolet absorber and laminated onto one side surface of the polyolefin layer 103, and the cyclic olefin polymer layer 102 laminated onto the surface of the colored layer 101 at the opposite side of the polyolefin layer 103. In the thermoplastic multilayer plastic material, the polyolefin layer 103 is the layer forming the outer layer of the colored plastic container, and the cyclic olefin polymer layer 102 is the layer forming the inner layer of the colored plastic container. Also, the colored layer 101 is the layer forming the intermediate layer of the colored plastic container.

Each of the thermoplastic multilayer plastic materials shown in FIG. 8 to FIG. 10 may have adhesive layers disposed between the respective layers. In this case, for example, the adhesive property of the colored layer 101 and the cyclic olefin polymer layer 102, the adhesive property of the cyclic olefin polymer layer 102 and the polyolefin layer 103, the adhesive property of the colored layer 101 and the intermediate layer 104, the adhesive property of the cyclic olefin polymer layer 102 and the respective polyolefin layers 105 and 106 in the intermediate layer 104, the adhesive property of the colored layer 101 and the polyolefin layer 103, etc., can be improved.

With the present invention, although the layer arrangement of the thermoplastic multilayer plastic material is not restricted in particular, for example, the colored layer 101 is preferably disposed as much as possible at the outer side of the colored plastic container to efficiently impart the colored plastic container with a light blocking property. This measure is especially effective in a case where the colored plastic container is an ampule or other comparatively small container.

The plastic material forming the colored layer is not restricted in particular besides being a plastic material with thermoplasticity, and a polyolefin can be cited as a specific example.

The polyolefin is not restricted in particular, and polyethylene-based resins and polypropylene-based resins can be cited as preferable examples. A polypropylene-based resin is favorably used in a case where heat resistance is required of the colored plastic container.

As examples of polyethylene-based resins, homopolymers, such as a high-pressure (branched) low-density polyethylene (HP-LDPE), straight-chain low-density polyethylene (LLDPE), medium-density polyethylene (MDPE), high-density polyethylene (HDPE), etc., and polyethylene-based copolymers can be cited. α-olefins, such as propylene, butene-1, pentene-1, hexene-1,4-methylpentene-1, octene-1, decene-1, etc., can be cited as examples of the comonomer besides ethylene in the polyethylene-based copolymer. Also, in the polyethylene-based copolymer, the content proportion of the comonomer besides ethylene is preferably no more than 20 mole % and more preferably 3 to 20 mole %.

Although properties of the polyethylene-based resin are not restricted in particular, a comparatively low density is preferable for example, and specifically, the density is preferably in a range of 0.910 to 0.930 g/cm$^3$. Also, the melt flow rate (MFR) is preferably 0.2 to 20 g/10 minutes (190° C.) These properties of the polyethylene-based resin are favorable for improving the mechanical characteristics of the colored plastic container and are especially favorable in a case where the cyclic olefin polymer layer is disposed between the colored layer and the inner layer.

As examples of the polypropylene-based resin, homopolymers, such as isotactic polypropylene, syndiotactic polypropylene, etc., and polypropylene-based copolymers can be cited. As examples of the comonomer besides propylene in the polypropylene-based copolymer, α-olefins, such as ethylene, butene-1, pentene-1, hexene-1,4-methylpentene-1, octene-1, decene-1, etc., can be cited. The content proportion of the comonomer besides propylene in the copolymer is preferably no more than 30 mole %, more preferably 2 to 30 mole %, and even more preferably 3 to 25 mole %.

Although properties of the polypropylene-based resin are not restricted in particular, for example the MFR is preferably 0.2 to 20 g/10 minutes (230° C.). A polypropylene-based resin with the MFR within the above range is favorable for improving the mechanical characteristics of the colored plastic container and is especially favorable in a case where the cyclic olefin polymer layer is disposed between the colored layer and the inner layer.

Also, the colored layer may be formed, for example, from a mixture of polypropylene, a polypropylene elastomer, and a nucleating agent. In this case, the transparency of the colored layer can be improved.

As examples of the nucleating agent, phosphate-based nucleating agents, such as sodium 2,2'-methylene-bis-(4,6-di-t-butylphenyl)phosphate (NA-11), hydroxyaluminum-bis [2,2'-methylene-bis-(4,6-di-t-butylphenyl)phosphate] (NA-21), etc., can be cited.

The pigment is a component that is compounded for a purpose of lowering the light transmittance of the colored plastic container to prevent alteration due to light rays (especially ultraviolet rays) of the contents (for example, a drug solution, etc.) stored in the colored plastic container. Besides the above purpose, the pigment may be compounded for the purpose of imparting design quality to the colored plastic container.

The pigment contained in the colored layer is selected as suited according to the type of the contents contained in the colored plastic container, that is, according to a wavelength range of the light rays to be blocked to improve the preservation property of the contents.

Specifically, in a case where the contents stored in the colored plastic container are principally those with which light rays of the ultraviolet region should be blocked, organic pigments, including azo condensation pigments (such as C. I. pigment yellow 95 indicated by the formula below, C. I. pigment yellow 93 indicated by the formula below, C. I. pigment yellow 94 indicated by the formula below, C. I. pigment yellow 128 indicated by the formula below, C. I. pigment red 144, C. I. pigment red 220, C. I. pigment red 221, C. I. pigment red 242, etc.), isoindoline pigments (such as C. I. pigment yellow 110 indicated by the formula below, C. I. pigment yellow 109, C. I. pigment yellow 139, C. I. pigment yellow 173, C. I. pigment orange 61, C. I. pigment orange 68, etc.), monoazo pigments (such as C. I. pigment yellow 181, etc.), disazo pigments (such as C. I. pigment yellow 180, etc.), anthraquinone-based pigments (such as C. I. pigment yellow 147, etc.), dioxazine-based pigments, quinacridone-based pigments, etc., and inorganic pigments, including iron oxide, C. I. pigment blue 28 (cobalt blue; cobalt aluminate), C. I. pigment yellow 53 (titanium yellow; nickel yellow), etc., can be cited as examples of the pigment.

[Chemical Formula 3]

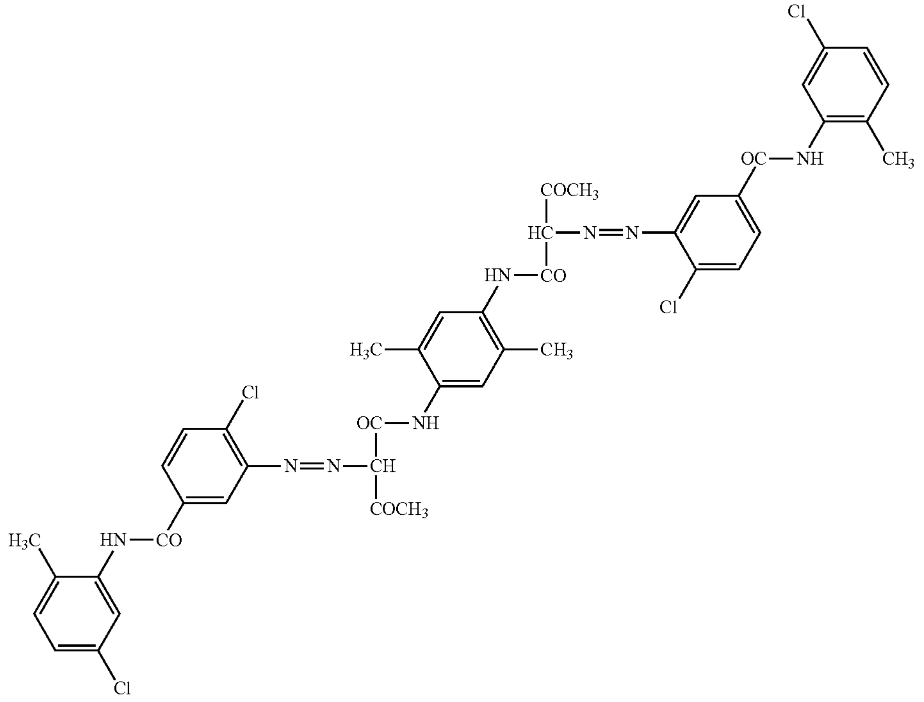

(C.I.Pigment Yellow 95)

[Chemical Formula 4]

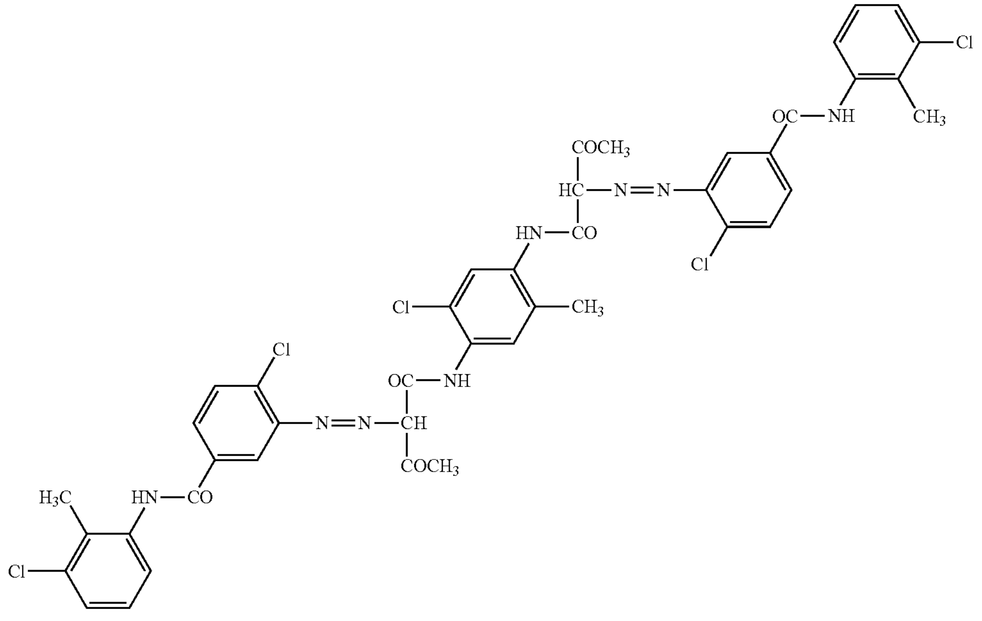

(C.I.Pigment Yellow 93)

-continued
[Chemical Formula 5]
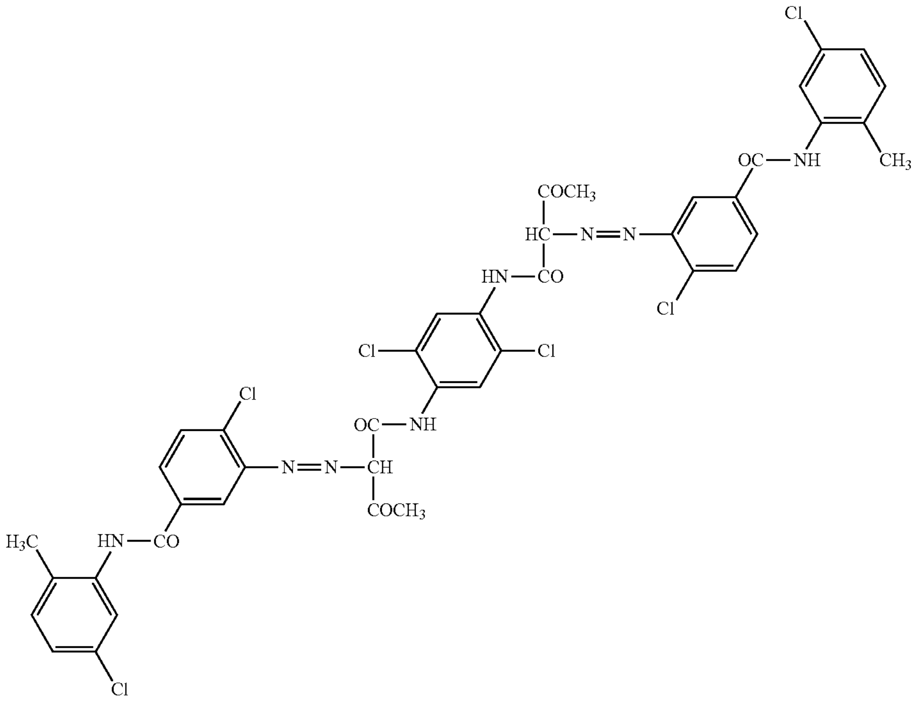
(C.I.Pigment Yellow 94)
[Chemical Formula 6]
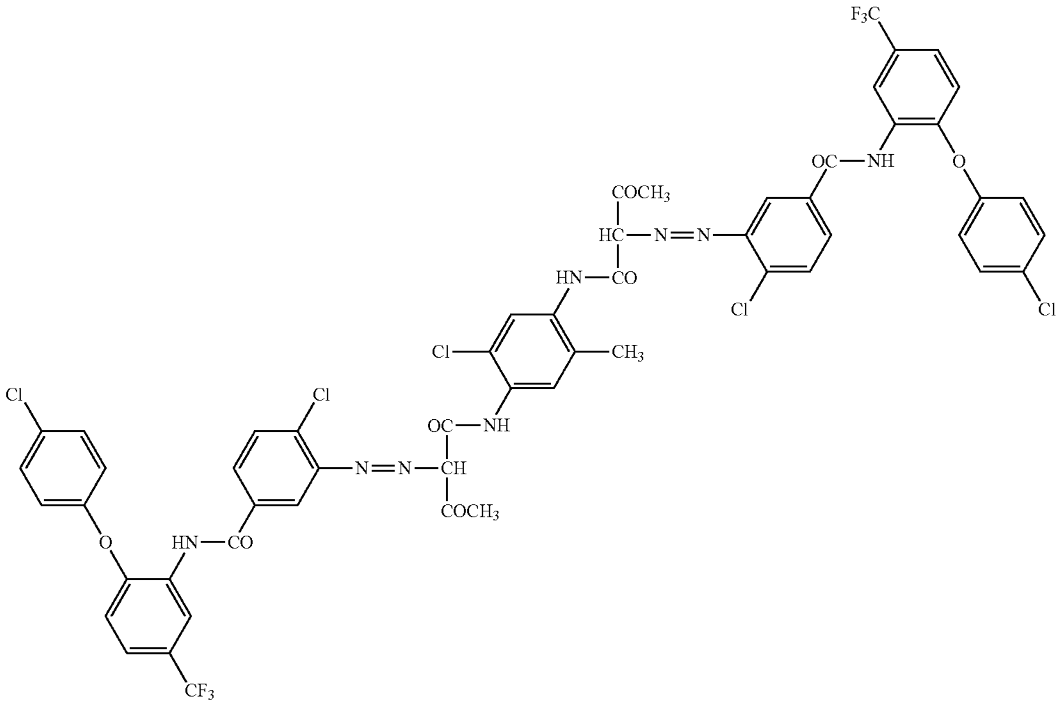
(C.I.Pigment Yellow 128)

-continued

[Chemical Formula 7]

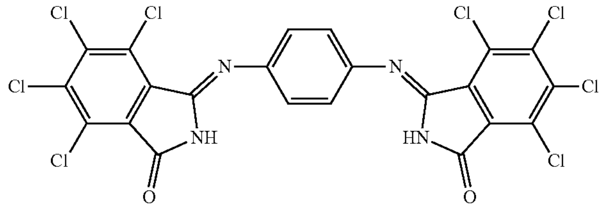

(C.I.Pigment Yellow 110)

Among the above, an azo condensation yellow pigment is favorable as the pigment from a standpoint of blocking light rays of the ultraviolet region efficiently. Or, for example, in a case where the drug solution stored in the colored plastic container is an aqueous solution of sodium ozagrel, an azo condensation yellow pigment is favorable as the pigment from a standpoint of improving the effect of suppressing the alteration of sodium ozogrel, and C. I. pigment yellow 95 is especially favorable.

The ultraviolet absorber is a component that is compounded for a purpose of lowering an ultraviolet transmittance of the colored plastic container to prevent alteration of the contents (for example, a drug solution, such as an aqueous solution of sodium ozagrel, etc.) contained in the colored plastic container by ultraviolet rays.

As examples of the ultraviolet absorber contained in the colored layer, ultraviolet absorbers that are benzophenone-based, benzotriazole-based, triazine-based, anilide oxalate-based, cyanoacrylate-based, etc., can be cited. Benzotriazole-based ultraviolet absorbers are especially favorable.

In regard to benzotriazole-based ultraviolet absorbers, such benzotriazole-based ultraviolet absorbers as 2-(2'-hydroxy-3'-tert-butyl-5'-methylphenol)-5-chlorobenzo triazole (product of the trade name “Tinuvin (registered trademark) 326,” made by Ciba Specialty Chemicals Inc.), 2-(2'-hydroxy-5'-methylphenol)benzotriazole (product of the trade name “Tinuvin (registered trademark) P,” made by the same company), 2-(2'-hydroxy-3',5'-bis(methylbenzyl)phenol) benzotriazole (product of the trade name “Tinuvin (registered trademark) 234,” made by the same company), 2-(2'-hydroxy-3',5'-di-tert-butylphenol)-5-chlorobenzotriazole (product of the trade name “Tinuvin (registered trademark) 327,” made by the same company), 2-(2'-hydroxy-3',5'-di-tert-amylphenol)benzotriazole (product of the trade name“Tinuvin (registered trademark) 328,” made by the same company), 2-(2'-hydroxy-5'-tetramethylbutylphenol)benzotriazole (product of the trade name “Tinuvin (registered trademark) 329,” made by the same company), etc., can be cited as examples.

Also, for example, in a case where the drug solution stored in the colored plastic container is sodium ozagrel (specifically, an aqueous solution thereof or the solitary substance, etc.), a benzotriazole-based ultraviolet absorber is favorable, and the product of the trade name “Tinuvin (registered trademark) 326” is especially favorable.

The colored layer may further have various additives besides the pigment and the ultraviolet absorber compounded therein as necessary.

For example, from standpoints of improving the efficiency of ultraviolet absorption by the ultraviolet absorber and reducing the usage amount of the ultraviolet absorber, metal oxide microparticles may furthermore be contained along with the ultraviolet absorber.

As examples of the metal oxide of the metal oxide microparticles, titanium oxide, zinc oxide, iron oxide, cerium oxide, magnesium oxide, etc., can be cited. Although the combination of the ultraviolet absorber and the metal oxide microparticles is not restricted in particular, a combination of the product of the trade name “Tinuvin (registered trademark) 326” and zinc oxide microparticles can be cited as a preferable example.

The inner layer is a layer formed of a plastic material with thermoplasticity, and a polyolefin layer, a cyclic olefin polymer layer, etc., can be cited as specific examples as mentioned above.

As examples of the polyolefin forming the polyolefin layer, the same types as those of the plastic material forming the colored layer can be cited.

As examples of the cyclic olefin-based polymer forming the cyclic olefin polymer layer, a copolymer of a cyclic olefin and an olefin, a ring-opened polymer of a cyclic olefin, and a hydrogenate of any of the above can be cited. As specific examples, a copolymer of ethylene and a dicyclopentadiene, a copolymer of ethylene and a norbornene-based compound, a ring-opened polymer of a cyclopentadiene derivative, a ring-opened copolymer of two or more types of cyclopentadiene derivatives, and a hydrogenate of any of the above can be cited. Among the above, a hydrogenate of a copolymer of ethylene and a norbornene-based compound and a hydrogenate of a ring-opened (co)polymer of one type or two or more types of cyclopentadiene derivatives can be cited as preferable examples.

By disposing the cyclic olefin polymer layer as the inner layer, transfer of the pigment and the ultraviolet absorber in the colored layer into the contents of the colored plastic container can be prevented. Further, the mechanical strength and water permeation preventing ability of the colored plastic container can be improved, and a gas permeation preventing ability can be imparted to the colored plastic container.

Although the glass transition temperature (Tg) of the cyclic olefin-based polymer is not restricted in particular, it is preferably 60 to 80° C. and more preferably 65 to 80° C. as the midpoint glass transition temperature ($T_{mg}$) measured by input compensation differential scanning calorimetry (input compensation DSC) described in JIS K $7121_{-1987}$ “Testing Methods for Transition Temperatures of Plastics.”

When the Tg of the cyclic olefin-based polymer exceeds 80° C., for example, in a case where the colored plastic container is an ampule to be described below, problems, such as remaining of fine pieces of resin, called “whiskers,” on an opening formed by tearing open the ampule and the force required for tearing open being too large, occur. Oppositely, when the Tg of the cyclic olefin copolymer falls below 60° C., the effect of preventing the transfer of the pigment and ultraviolet absorber in the colored layer and the gas and water vapor permeation preventing abilities may degrade.

Although the melt flow rate (MFR) of the cyclic olefin polymer is not restricted in particular, it is preferably 4 to 30 g/10 minutes (260° C.) from standpoints of moldability, mechanical characteristics, etc., of the colored plastic container.

Although the molecular weight of the cyclic olefin-based polymer is not restricted in particular, the number average molecular weight <Mn> is preferably 10,000 to 100,000 and more preferably 20,000 to 50,000. The average molecular weight is determined, for example, as a standard polystyrene equivalent value by gel permeation chromatography (GPC) analysis using cyclohexane as a solvent.

The intermediate layer is a layer made of a plastic material with thermoplasticity. Specific examples of the intermediate layer include the following:

(a) a cyclic olefin polymer layer;

(b) a laminate with a three-layer structure including a cyclic olefin polymer layer and a total of two polyolefin layers respectively laminated by one layer each onto one side surface and the other side surface of the cyclic olefin polymer layer;

(c) a colored layer; etc.

As examples of the polyolefin forming the polyolefin layer and the cyclic olefin-based polymer forming the cyclic olefin polymer layer, the same examples as those given above can be cited.

Also, even in a case where the cyclic olefin polymer layer is to be made the intermediate layer as in (a) and (b), above, the same actions and effects as those in the case of making the cyclic olefin polymer layer the inner layer are obtained. That is, the effect of preventing the pigment and the ultraviolet absorber in the colored layer from transferring into the interior of the colored plastic container, the effect of improving the strength of the colored plastic container, and the effect of improving the water and gas permeation preventing abilities are obtained.

In the cyclic olefin polymer layer formed as the intermediate layer, polyethylene may be compounded suitably for the purpose of improving the adhesion property between layers and lessening a hardness of the colored plastic container.

As the polyethylene to be compounded in the cyclic olefin polymer layer formed as the intermediate layer, that of a comparatively high density is preferable from a standpoint of maintaining the transparency of the thermoplastic multilayer plastic material. Specifically for example, a polyethylene with a density of 0.935 to 0.970 g/cm$^3$ is favorable. Also, the content proportion of the polyethylene is preferably 5 to 20 weight parts with respect to a total of 100 weight parts of the cyclic olefin polymer layer.

Also, as examples of the plastic material forming the colored layer and the pigment, ultraviolet absorber, and other additives contained in the colored layer in a case where the colored layer is the layer forming the intermediate layer of the colored plastic container, the same examples as those given above can be cited.

A layer such as an adhesive layer, a gas barrier layer, an oxygen absorbing layer, a sealant layer, etc., may be laminated as necessary onto the thermoplastic multilayer plastic material.

As an example of the adhesive layer, a layer formed of an adhesive resin, such as an unsaturated carboxylic acid-modified polyethylene, an ethylene-acrylic acid copolymer, an ethylene-vinyl acetate copolymer, etc., can be cited. As another example of the adhesive layer, a layer formed of a low-density polyethylene, in particular, a polyethylene polymerized using a metallocene catalyst or other single-site catalyst and having a density of 0.890 to 0.920 g/cm$^3$ can be cited.

In the colored plastic container according to the present invention, a thickness T of the colored layer is set to 50 to 1000 μm.

When the thickness T of the colored layer falls below 50 μm, it becomes difficult to compound the pigment and the ultraviolet absorber in the colored layer at amounts adequate to exhibit the actions and effects of the present invention. Oppositely when the thickness T of the colored layer exceeds 1000 μm, the thickness of the thermoplastic multilayer plastic material becomes too large as a whole and the moldability and handling properties of the colored plastic container degrade.

Especially within the above range, the thickness T of the colored layer is preferably 50 to 400 μm and more preferably 50 to 300 μm. In particular, it is preferable for the thickness T of the colored layer to be 50 to 300 μm in a case where the colored plastic container is a colored plastic ampule.

In the colored plastic container according to the present invention, a product PT of a content proportion P (weight %) of the pigment in the colored layer and the thickness T (μm) of the colored layer is set to satisfy Formula (1) below:

$$1 \leqq PT \leqq 150 \quad (1)$$

By setting a product UT of a content proportion U (weight %) of the ultraviolet absorber in the colored layer and the thickness T (μm) of the colored layer in a range described below while setting the value of the product PT in the range of Formula (1), wavelengths of the ultraviolet region can be blocked efficiently while maintaining appropriate visibility of the interior of the container. Meanwhile, when the value of the product PT falls below the above range, the effect of blocking wavelengths of the ultraviolet region becomes inadequate. Oppositely, when the value of PT exceeds the above range, it becomes difficult to check conditions of the interior of the colored plastic container.

Especially in the above range, the value of the product PT is preferably 5 to 120 and more preferably 5 to 60.

Although the compounding amount of the colorant in the colored layer is not restricted in particular besides being set to satisfy the range of Formula (1) in relationship with the thickness T of the colored layer, it is preferable from the standpoint of dispersibility in the colored layer, etc., that the content proportion in the colored layer be, for example, 0.01 to 0.4 weight %.

In the colored plastic container according to the present invention, the product UT of the content proportion U (weight %) of the ultraviolet absorber in the colored layer and the thickness T (μm) of the colored layer is set to satisfy Formula (2) below when the product PT of the content proportion P (weight %) of the pigment in the colored layer and the thickness T (μm) of the colored layer exceeds 20 and to satisfy Formula (3) below when the product PT is no more than 20.

$$5 \leqq UT \leqq 160 \quad (2)$$

$$20 < UT \leqq 160 \quad (3)$$

By setting the value of the product PT to be within the range of Formula (1) while setting the value of the product UT to be within the range of Formula (2) or Formula (3), wavelengths of the ultraviolet region can be blocked efficiently while maintaining appropriate visibility of the interior of the container.

On the other hand, when the value of the product UT falls below the range of Formula (2) when the product PT exceeds 20 or falls below the range of Formula (3) when the product PT is no more than 20, the effect of blocking wavelengths of the ultraviolet region becomes inadequate. Oppositely, when the value of UT exceeds the above range, the dispersibility of the ultraviolet absorber in the colored layer may degrade.

Especially within the above range, the value of the product UT in the case where the product PT exceeds 20 is preferably 5 to 120 and more preferably 10 to 100.

Meanwhile, especially within the above range, the value of the product UT in the case where the product PT is no more than 20 is preferably 30 to 160 and more preferably 35 to 160.

Although the compounding amount of the ultraviolet absorber in the colored layer is not restricted in particular besides being set to satisfy the range of Formula (2) in relationship with the thickness T of the colored layer, it is preferable from the standpoint of dispersibility in the colored layer, etc., that the content proportion in the colored layer be, for example, 0.01 to 0.4 weight %.

Ina case where the other side surface of the colored layer is an outer side surface of the thermoplastic multilayer plastic material, that is, when the colored layer forms the outer layer of the colored plastic container, a quotient U/T of the content proportion U (weight %) of the ultraviolet absorber in the colored layer divided by the thickness T (μm) of the colored layer preferably satisfies Formula (4) below.

$$U/T \leqq 0.004 \quad (4)$$

When the quotient U/T exceeds the above range, the ultraviolet absorber may exude (bleed) from the colored layer to an exterior of the colored plastic container.

Especially, within the above range, the value of the quotient U/T is preferably no more than 0.0038 and more preferably 0.0001 to 0.0038.

Preferably in the colored plastic container according to the present invention, the thicknesses of the respective layers besides the colored layer are each set in a range of 10 to 50% with respect to the entirety of the layers formed of the thermoplastic multilayer plastic material. The proportions of the thicknesses of the respective layers can be set as suited according to the type and storage amount of the contents stored in the multilayer plastic container, etc.

The thickness of the thermoplastic multilayer plastic material as whole is set as suited according to the usage of the multilayer plastic container, the type and storage amount of the stored contents, etc., and although it is not restricted in particular, for example, it is preferably 300 to 1500 μm and more preferably 400 to 1200 μm.

The drug contained in the colored plastic container according to the present invention is not restricted in particular and an aqueous solution of sodium ozagrel can be cited as a preferable example.

The form of the colored plastic container according to the present invention is not restricted in particular, and ampules, flexible bag containers, bottles, etc., can be cited as examples.

Figure 11:
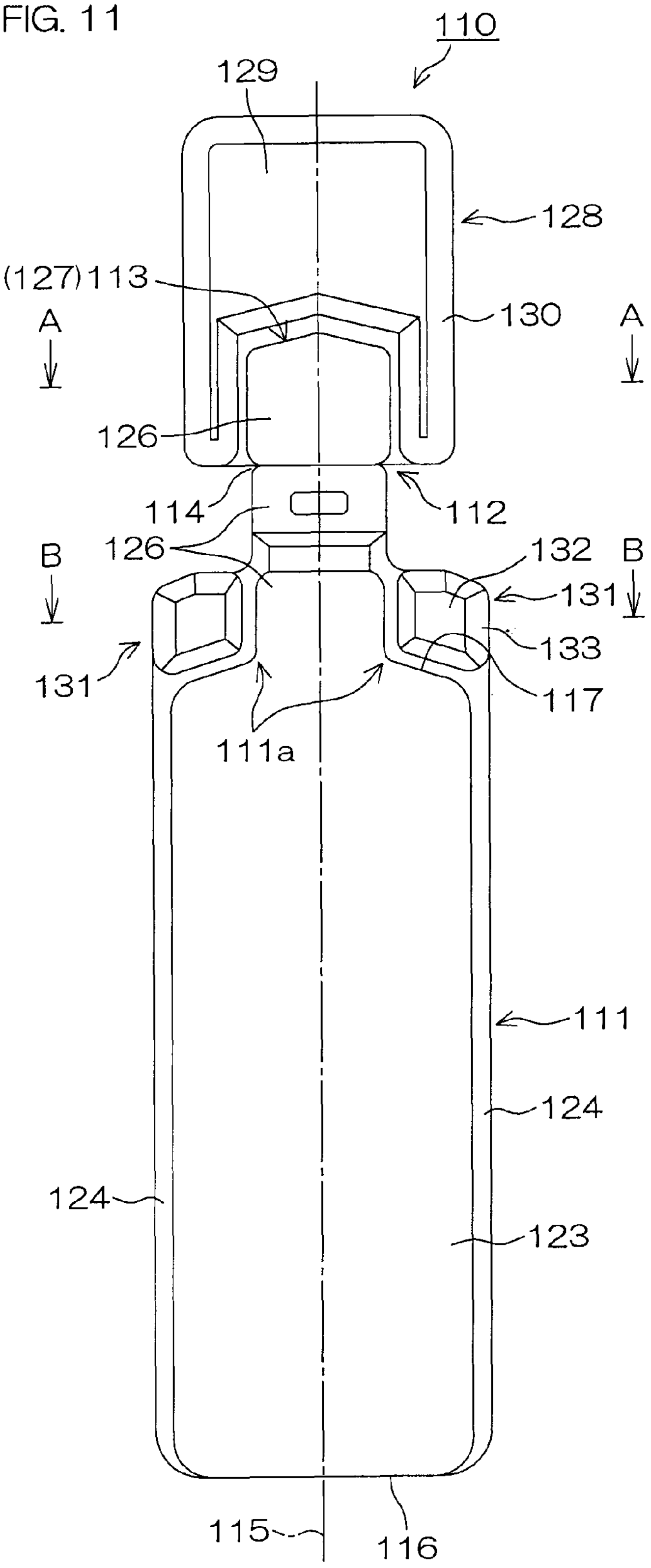
FIG. 11 is a front view of an embodiment of a colored plastic container.
Figure 12:
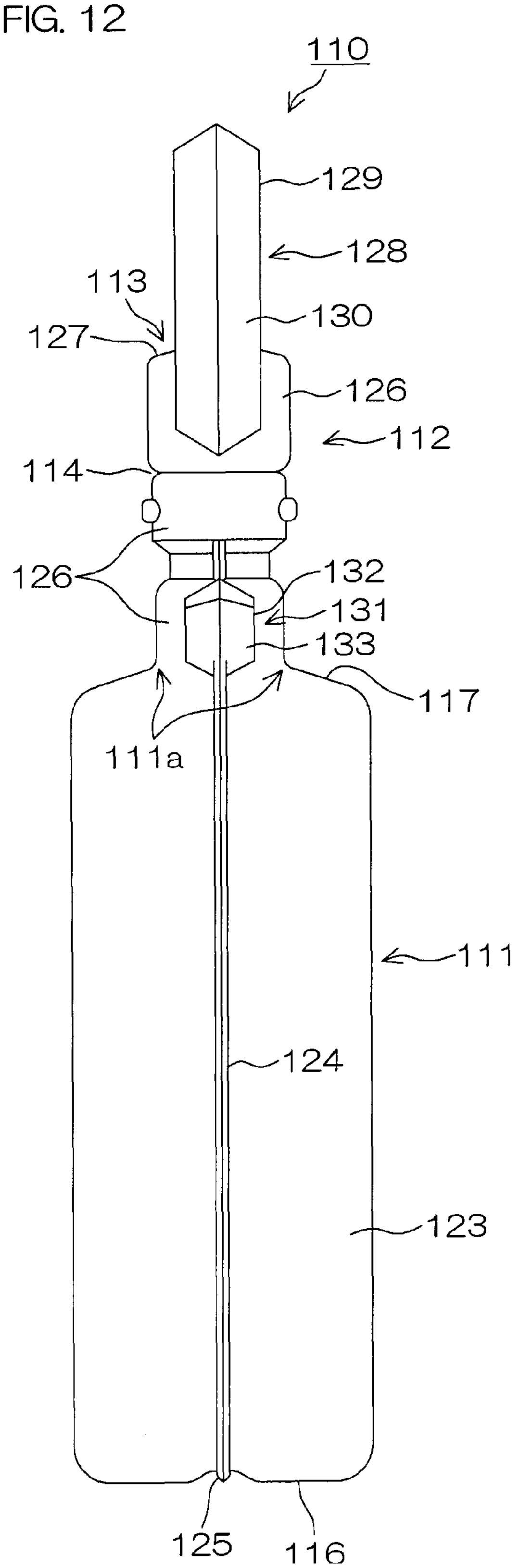
FIG. 12 is a side view of the colored plastic container shown in FIG. 11.
Figure 13:
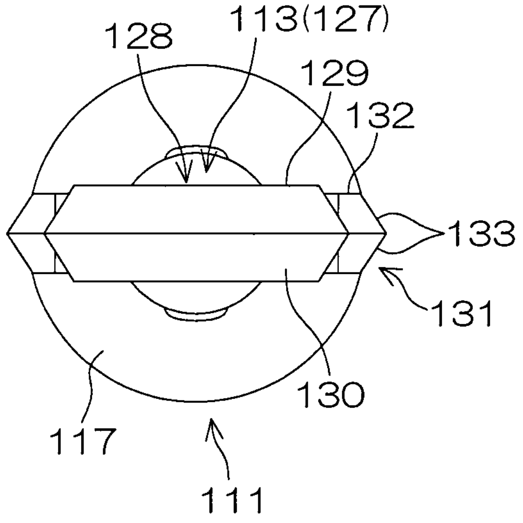
FIG. 13 is a plan view of the colored plastic container shown in FIG. 11.
Figure 14:
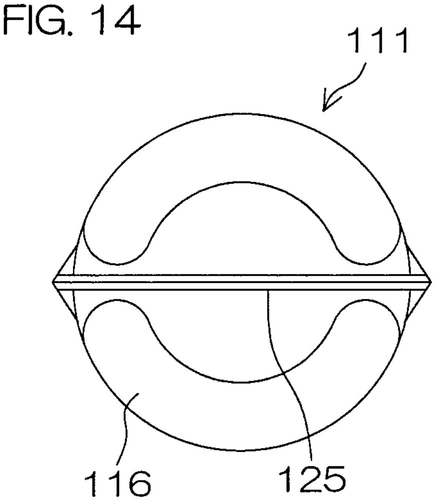
FIG. 14 is a bottom view of the colored plastic container shown in FIG. 11.
Figure 15:
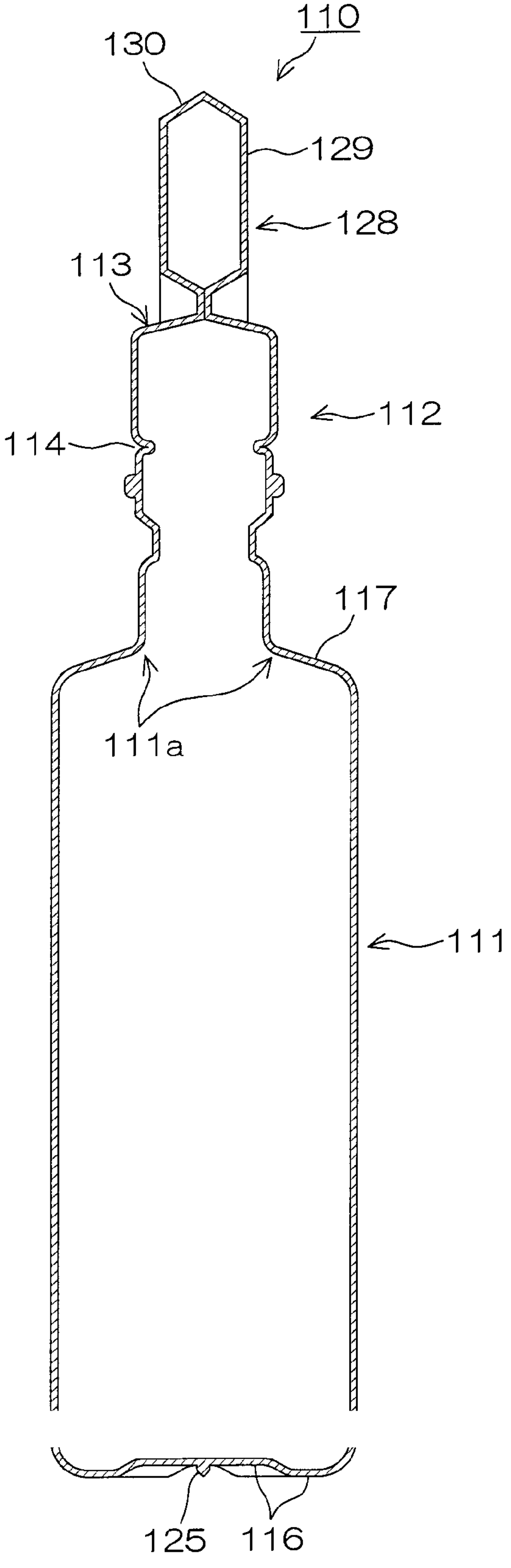
FIG. 15 is a side sectional view of the colored plastic container shown in FIG. 11.

FIG. 11 is a front view of an example of a colored plastic ampule as an embodiment of the colored plastic container, FIG. 12 is a side view thereof, FIG. 13 is a plan view thereof, FIG. 14 is a bottom view thereof, and FIG. 15 is a side sectional view thereof.

As shown in FIG. 11 and FIG. 12, the colored plastic ampule 110 includes a drug solution storage part 111 formed to a bottomed cylindrical shape and being for storing a drug solution, a drug solution discharge tube 112 in communication with an open end 111*a* of the drug solution storage part 111 and extending toward one side, and a top part 113 closing an end at the one side of the drug solution discharge tube 112, and the drug solution discharge tube 112 includes a fragile part 114 that is formed to have a thin thickness along a circumferential direction.

The drug solution storage part 111 has the open end 111*a* formed at an end at the one side opposite a bottom part 116 in a longitudinal direction extending along a central axis 115 of the drug solution storage part 111, and has a shoulder part 117, which decreases in diameter from the bottom part 116 side toward the open end 111*a* side (toward the one side), in a vicinity of the open end 111*a*.

Although as shown in FIG. 13 and FIG. 14, a cross-sectional shape of the drug solution storage part 111 is formed to be circular in plan view or bottom view, the cross-sectional shape of the drug solution storage part 111 is not restricted thereto and may be formed, for example, to be elliptical.

Referring again to FIG. 11 and FIG. 12, the drug solution discharge tube 112 is formed to continue from the open end 111*a* of the drug solution storage part 111 and extend along an axial direction of the central axis 115 of the drug solution storage part 111 with the same axis as the central axis 115 as its central axis. At the end at the one side of the drug solution discharge tube 112 (that is, the end of the drug solution discharge tube 112 at the side opposite the open end 111*a* side of the drug solution storage part 111) is formed the top part 113 that continues from the end at the one side and seals the drug solution discharge tube 112.

The drug solution discharge tube 12 preferably has an inner diameter that fits with a nozzle of a syringe for suctioning the drug solution inside the drug solution storage part 111 when the nozzle is inserted so that the nozzle is fixed in a stable state, and preferably has an adequate length in the axial direction of the drug solution discharge tube 112 between the drug solution storage part 111 and the top part 113.

The drug solution storage part 111, the drug solution discharge tube 112, and the top part 113 are mutually continuous, integral, and form a closed region for storing and sealing the drug solution.

Also, the drug solution discharge tube 112 has the fragile part 114 formed to have the thin thickness along the circumferential direction of the drug solution discharge tube 112 at a substantially middle portion between the open end 111*a* of the drug solution storage part 111 and the end at the one side of the drug solution discharge tube 112 (see FIG. 15).

The fragile part 114 can thereby be twisted off or cleaved and torn open readily by holding the drug solution storage part 111 and the top part 113 side of the drug solution discharge tube 112 and twisting or bending these parts with respect to each other. The colored plastic ampule 110 can thereby be opened.

Also, the drug solution discharge tube 112 is thereby opened and a nozzle of an unillustrated syringe can be inserted into the opening thus formed to collect the drug solution stored in the drug solution storage part 111. The syringe is used, for example, by inserting its nozzle, without an injection needle being attached to a tip of the nozzle, into the opening of the drug solution discharge tube 112 and suctioning the drug solution stored inside the drug solution storage part 111.

As shown in FIG. 11 and FIG. 12, the drug solution storage part 111 has, on an outer peripheral surface 123 thereof, a rib 124 extending along an axial direction of the central axis 115 and protruding outward in radial directions from the outer peripheral surface 123 of the drug solution storage part 111 at positions that oppose each other across the central axis 115 of the drug solution storage part 111. Also, the drug solution storage part 111 has, on a bottom part 116 thereof, a rib 125 protruding outward from the bottom part 116, and the rib 124 on the outer peripheral surface 123 and the rib 125 on the bottom part 116 are mutually continuous.

By the two mutually continuous ribs 124 and 125 being formed on the outer peripheral surface 123 of the drug solution storage part 111, the drug solution storage part 111 is imparted with rigidity, and shape maintenance of the drug solution storage part 111 is achieved.

As shown in FIG. 11 and FIG. 12, on an outer peripheral surface 126 of the drug solution discharge tube 112 is provided a tab 128 that protrudes to an outer side of the drug solution discharge tube 112 in continuation from a portion of the drug solution discharge tube 112 at a top part 113 side relative to the fragile part 114 and protrudes to an outer side of the top part 113 in continuation from an outer surface 127 of the top part 113.

By the tab 128 thus being formed continuously between the top part 113 side relative to the fragile part 114 of the drug solution discharge tube 112 and the top part 113, the drug solution storage part 111 and the drug solution discharge tube 112 are made unlikely to deform when the drug solution storage part 111 and the top part 113 side of the drug solution discharge tube 112 are held and twisted or bent with respect to each other. Also, the operation of opening the colored plastic ampule 110 by twisting off or cleaving the fragile part 114 of the drug solution discharge tube 112 can thereby be performed easily and yet reliably.

The tab 128 includes a flat part 129 and a chamfered part 130 formed at a periphery of the flat part 129, and an interior of the tab 128 forms a hollow, thick portion. The rigidity of the tab 128 itself is thereby maintained, and deformation of the tab 128 when the tab 128 is held to open the colored plastic ampule 110 can be suppressed.

Also, as shown in FIG. 11 and FIG. 12, reinforcing members 131 that respectively protrude to outer sides of the drug solution discharge tube 112 and the drug solution storage part 111 and are mutually connected are provided at the outer peripheral surface of the drug solution storage part 111 at the shoulder part 117 and the outer peripheral surface 126 of the drug solution discharge tube 112 at the drug solution storage part 111 side relative to the fragile part 114.

By the reinforcing members 131 being formed continuously so as to span across a portion of the drug solution discharge tube 112 at the drug solution storage part 111 side relative to the fragile part 114 and the shoulder part 117 of the drug solution storage part 111, the rigidity between the drug solution storage part 111 and the drug solution discharge tube 112 is improved significantly.

The drug solution discharge tube 112 that protrudes from the drug solution storage part 111 is thereby made unlikely to break, for example, during transport and handling of the colored plastic ampule 110.

Also, the opening operation of the colored plastic ampule 110 can be performed easily and yet reliably because fingers can be set easily on the reinforcing members 131 in the process of pinching the tab 128 and twisting off or cleaving and a reliable spin preventing action is also provided.

Each reinforcing member 131 includes a flat part 132 and a chamfered part 133 formed at a periphery of the flat part 132, and an interior of the tab 128 forms a hollow, thick portion. The rigidity of each reinforcing member 131 itself is thereby maintained to further improve the reinforcing effect, and the deformation of the reinforcing members 131 can be suppressed when the reinforcing members 131 are held to open the colored plastic ampule 110. Moreover, good contact with the reinforcing members 131 can be made with the fingers when the tab 128 is twisted.

The tab 128 and the reinforcing members 131 can be molded along with the respective parts of the drug solution storage part 111, the drug solution discharge tube 112, and the top part 113 during manufacture of the colored plastic ampule 110.

The colored plastic ampule 110 can be manufactured, for example, by a molding method that combines the so-called blow-fill-seal method and the multilayer blow molding method.

Specifically, first, the thermoplastic multilayer plastic material is extrusion molded to prepare a parison with a multilayer structure in which the respective layers are mutually fused and laminated.

That is, the thermoplastic multilayer plastic material, which includes the colored layer containing the pigment and the ultraviolet absorber, and the inner layer laminated directly or across the intermediate layer onto the one side surface of the colored layer, and with which the thickness T of the colored layer is set in a range of 50 to 1000 μmm, the product PT of the content proportion P (weight %) of the pigment in the colored layer and the thickness T (μm) of the colored layer satisfies Formula (1) below, and the product UT of the content proportion U (weight %) of the ultraviolet absorber in the colored layer and the thickness T (μm) of the colored layer satisfies Formula (2) below when the product PT exceeds 20 and satisfies Formula (3) below when the product PT is no more than 20, is extrusion molded to prepare the parison with the multilayer structure in which the respective layers are mutually fused and integrated.

$$1 \leqq PT \leqq 150 \quad (1)$$

$$5 \leqq UT \leqq 160 \quad (2)$$

$$20 < UT \leqq 160 \quad (3)$$

The multilayer parison thus obtained is then sandwiched in a split mold and the respective parts of the drug solution storage part 111, the drug solution discharge tube 112, and the reinforcing members 131 are formed (blowing step), the interior of the drug solution storage part 111 is filled with the drug solution (filling step), and the top part 113 and the tab 128 are formed by further sandwiching with a split mold to form a closed region made up of the drug solution storage part 111, the drug solution discharge tube 112, and the top part 113 (sealing step) and thereby obtain the sealed colored plastic ampule (colored plastic container) 110 filled with the drug solution.

The parison with the multilayer structure can be prepared according to a conventional method for multilayer blow molding. The extruder, die shape, molding conditions of the parison with the multilayer structure, etc., are not restricted in particular, and these may be set as suited in accordance with the conventional method for multilayer blow molding.

Also, the manufacture of the plastic ampule by the blow-fill-seal method using the parison with the multilayer structure can be carried out in the same manner as in manufacture of a plastic ampule by the BFS method using a parison with a single layer structure with the exception of the difference in the layer structure of the parison (differences in the number of extruders and the structures of the dies for forming the parison). The respective layers of the multilayer film may be mutually fused and laminated as mentioned above or may be mutually adhered by interposing layers made of the adhesive resin between the respective layers.

The thickness of the drug solution storage part of the colored plastic ampule 110 is preferably 300 to 1500 μm from a standpoint of efficiently blocking entry of light rays of the ultraviolet region into the interior from the exterior of the colored plastic ampule 110.

The colored plastic ampule (colored plastic container) 110 can be molded by any of various methods. Among these, the blow-fill-seal method can be cited as a preferable method.

With the colored plastic container according to the present invention, by compounding the pigment and the ultraviolet absorber at specific ranges, a performance such that a transmittance of light rays of 200 to 380 nm wavelength is no more than 5% and a transmittance of light rays of 600 nm wavelength is no less than 40% can be imparted without causing problems such as bleeding, etc. The plastic ampule according to the present invention can thus be used widely, for example, in medical applications and is especially suited for storage of photodegrading drug agents, specifically, an aqueous solution of sodium ozagrel, etc.

Although embodiments of the present invention have been described above, embodiments of the present invention are not restricted thereto and design changes can be made as suited within a scope in which the scope of the present invention is not changed.

EXAMPLES

Although the present invention shall now be described based on examples and comparative examples, the present invention is not restricted by the examples.

<Manufacture and Opening Property Evaluation of Plastic Ampules>

Examples 1-1 to 1-6 and Comparative Examples 1-1 to 1-2

(1) Manufacture of Plastic Ampules

The forming materials of multilayer films are as follows.

COC1: Cyclic olefin copolymer (ethylene-tetracyclododecene-based copolymer), glass transition temperature (Tg): 70° C., made by Mitsui Chemicals, Inc., trade name: "APEL (registered trademark) APL8008T"

COC2: Cyclic olefin copolymer (ethylene-tetracyclododecene-based copolymer), Tg: 80° C., made by Mitsui Chemicals, Inc., trade name: "APEL (registered trademark) APL6509T"

COC3: Cyclic olefin copolymer (ethylene-tetracyclododecene-based copolymer), Tg: 105° C., made by Mitsui Chemicals, Inc., trade name: "APEL (registered trademark) APL6011T"

COP1: Cyclic olefin-based polymer (hydrogenate of a norbornene-based ring-opened polymer), Tg: 70° C., made by Zeon Corp., trade name: "Zeonoa (registered trademark) 750R"

COP2: Cyclic olefin-based polymer (hydrogenate of a norbornene-based ring-opened polymer), Tg: 102° C., made by Zeon Corp., trade name: "Zeonoa (registered trademark) 1020R"

PE1: High-pressure low-density polyethylene, density: 0.928 g/$cm^3$, made by Ube-Maruzen Polyethylene Co., Ltd., trade name: "UBE polyethylene (registered trademark) B128H"

PE2: PE1 with an ultraviolet absorber (2-(2'-hydroxy-3'-tert-butyl-5'-methylphenol)-5-chlorobenz otriazole, made by Ciba Specialty Chemicals Inc., trade name: "Tinuvin (registered trademark) 326,") and zinc oxide microparticles (average particle diameter: 30 μm) compounded therein with the content proportion of the ultraviolet absorber being adjusted to 0.218 weight % and the content proportion of the zinc oxide microparticles being adjusted to 0.182 weight %

PE3: PE1 with the ultraviolet absorber (trade name: "Ciba Tinuvin (registered trademark) 326,") compounded therein with the content proportion of the ultraviolet absorber being adjusted to 0.24 weight %

PE4: High-density polyethylene, density: 0.940 g/$cm^3$, made by Prime Polymer Co., Ltd., trade name: "Ultzex (registered trademark) Uz4020B"

PE5: High-density polyethylene, density: 0.965 g/$cm^3$, made by Prime Polymer Co., Ltd., trade name: "Neozex (registered trademark) Nz65150B"

PE6: Straight-chain low-density polyethylene polymerized by a metallocene-based catalyst, density: 0.903 g/$cm^3$, made by Prime Polymer Co., Ltd., trade name: "Evolue (registered trademark) SP5010B"

Example 1-1

A plastic ampule for a storage amount of 2.5 mL and having the shape shown in FIG. 1 to FIG. 7 was manufactured by the blow-fill-seal method. 2.5 mL of physiological saline were filled and sealed inside the plastic ampule.

Also, for forming the plastic ampule, a multilayer plastic material (total thickness: 640 μm) with a five-layer structure including an outer layer 20 (thickness: 200 μm) made of PE2, an adhesive layer 22 (thickness: 20 μm) made of PE6 and formed on one side surface of the outer layer 20, an intermediate layer 18 (thickness: 200 μm) made of COC1 (Tg: 70° C.) and laminated on the adhesive layer 22 side of the outer layer 20, an adhesive layer 21 (thickness: 20 μm) made of PE6 and formed on a surface of the intermediate layer 18 at the opposite side of the surface of lamination to the outer layer 20, and an inner layer 19 (thickness: 200 μm) made of PE1 and laminated on the adhesive layer 21 side of the intermediate layer 18 was used. The thicknesses at the drug solution storage part 11 of the plastic ampule 10 are indicated as the total thickness of the multilayer plastic material and the thicknesses of the respective layers (intermediate layer 18, inner layer 19, outer layer 20, and respective adhesive layers 21 and 22) (the same applies hereinafter).

Example 1-2

Besides using a layer (thickness: 200 μm) formed of COC2 (Tg: 80° C.) in place of the layer formed of COC1 as the intermediate layer 18, a plastic ampule with physiological saline filled and sealed therein was manufactured in the same manner as in Example 1-1.

Example 1-3

Besides using a layer (thickness: 200 μm) formed of PE3 in place of the layer formed of PE2 as the outer layer 20 and using a layer (thickness: 200 μm) formed of COP1 (Tg: 70° C.) in place of the layer formed of COC1 as the intermediate layer 18, aplastic ampule with physiological saline filled and sealed therein was manufactured in the same manner as in Example 1-1.

Example 1-4

Besides using a layer (thickness: 200 μm) formed of a mixed resin, in which COC1 (Tg: 70° C.) and PE4 are mixed at a ratio of 3:1 (weight ratio), in place of the layer formed of COC1 as the intermediate layer 18, a plastic ampule with physiological saline filled and sealed therein was manufactured in the same manner as in Example 1-1.

Example 1-5

Besides using a layer (thickness: 200 μm) formed of a mixed resin, in which COP1 (Tg: 70° C.) and PE5 are mixed at a ratio of 3:1 (weight ratio), in place of the layer formed of COC1 as the intermediate layer 18, a plastic ampule with physiological saline filled and sealed therein was manufactured in the same manner as in Example 1-1.

Example 1-6

Besides using a layer (thickness: 200 μm) formed of a mixed resin, in which COP1 (Tg: 70° C.) and PE1 are mixed at a ratio of 19:1 (weight ratio), in place of the layer formed of COC1 as the intermediate layer 18, a plastic ampule with physiological saline filled and sealed therein was manufactured in the same manner as in Example 1-1.

Comparative Example 1-1

Besides using a layer (thickness: 200 μm) formed of COC3 (Tg: 105° C.) in place of the layer formed of COC1 as the intermediate layer 18, a plastic ampule with physiological saline filled and sealed therein was manufactured in the same manner as in Example 1-1.

Comparative Example 1-2

Besides using a layer (thickness: 200 μm) formed of COP2 (Tg: 102° C.) in place of the layer formed of COC1 as the intermediate layer 18, a plastic ampule with physiological saline filled and sealed therein was manufactured in the same manner as in Example 1-1.

The layer arrangements of the plastic ampules manufactured in Examples 1-1 to 1-6 and Comparative Examples 1-1 to 1-2 are shown in Table 1.

TABLE 1

| | Outer layer 20 | Adhesive layer 22 | Intermediate layer 18 | Adhesive layer 21 | Inner layer 19 | Total thickness (μm) |
|---|---|---|---|---|---|---|
| Example 1-1 | PE2 200 μm | PE6 20 μm | COC1 200 μm | PE6 20 μm | PE1 200 μm | 640 |
| Example 1-2 | PE2 200 μm | PE6 20 μm | COC2 200 μm | PE6 20 μm | PE1 200 μm | 640 |
| Example 1-3 | PE3 200 μm | PE6 20 μm | COP1 200 μm | PE6 20 μm | PE1 200 μm | 640 |
| Example 1-4 | PE2 200 μm | PE6 20 μm | COC1 + PE4 (3:1) 200 μm | PE6 20 μm | PE1 200 μm | 640 |
| Example 1-5 | PE2 200 μm | PE6 20 μm | COP1 + PE5 (3:1) 200 μm | PE6 20 μm | PE1 200 μm | 640 |
| Example 1-6 | PE2 200 μm | PE6 20 μm | COP1 + PE1 (19:1) 200 μm | PE6 20 μm | PE1 200 μm | 640 |
| Comparative Example 1-1 | PE2 200 μm | PE6 20 μm | COC3 200 μm | PE6 20 μm | PE1 200 μm | 640 |
| Comparative Example 1-2 | PE2 200 μm | PE6 20 μm | COP2 200 μm | PE6 20 μm | PE1 200 μm | 640 |

(2) Evaluation of Opening Property of Plastic Ampules

With each of the plastic ampules 10 manufactured in Examples 1-1 to 1-6 and Comparative Examples 1-1 to 1-2 and having physiological saline filled and sealed therein, after fixing the pair of reinforcing members 31 of the drug solution storage part 11 by a jig and holding the tab 28 of the drug solution discharge tube 12 by a jig, the tab 28 was rotated about the central axis 15 of the drug solution storage part 11 and the drug solution discharge tube 12 as a rotation axis, and the top part 13 side of the drug solution discharge tube 12, including the tab 28, was twisted off to open the plastic ampule 10.

Here, the force (N·m) required to twist off the top part 13 side of the drug solution discharge tube 12, including the tab 28, was measured using a rotating torque meter. The measurement results are shown in Table 2.

Also, after opening, a nozzle of a syringe for suctioning the physiological saline inside the drug solution storage part 11 was inserted into the opening of the drug solution discharge tube 12 at the side continuous with the drug solution storage part 11, the drug solution storage part 11 was then left with the opening of the drug solution discharge tube 12 facing downward, and occurrence of liquid leakage from the opening was checked. The results are shown in Table 2.

TABLE 2

| | Force required for opening [N · m] | Force required for opening per unit thickness [N · m/mm] | Liquid leakage |
|---|---|---|---|
| Example 1-1 | 0.37 | 0.58 | No leakage |
| Example 1-2 | 0.40 | 0.63 | No leakage |
| Example 1-3 | 0.35 | 0.55 | No leakage |
| Example 1-4 | 0.28 | 0.44 | No leakage |
| Example 1-5 | 0.25 | 0.39 | No leakage |
| Example 1-6 | 0.32 | 0.50 | No leakage |
| Comparative Example 1-1 | 0.44 | 0.69 | Leaks |
| Comparative Example 1-2 | 0.47 | 0.73 | Leaks |

As is clear from Table 2, although with all of the plastic ampules obtained in Examples 1-1 to 1-6, the thickness of the intermediate layer 18 is comparatively large, the force necessary for opening the plastic ampule 10 (that is, for tearing open the fragile part 14) could be set to a small value of no more than 0.65N·m/mm with respect to the thickness of the multilayer plastic material at the drug solution discharge tube 12. Also, after opening, liquid leakage from between the opening of the drug solution discharge tube 12 and the nozzle of the syringe was not observed.

On the other hand, with the plastic ampules of Comparative Example 1-1 and 1-2, with which the glass transition temperature of the cyclic olefin-based (co)polymer used to form the intermediate layer 18 falls outside the range of 60 to 80°

C., the force necessary for opening the plastic ampule 10 exceeded 0.65N·m/mm with respect to the thickness of the multilayer plastic material at the drug solution discharge tube 12, and leakage of liquid from the opening was observed.

Examples 1-7 to 1-9

(1) Manufacture of Plastic Ampules

The forming materials of the plastic ampules (multilayer films) are as follows. The materials that are the same as those indicated for Examples 1-1 to 1-6 are omitted.

PP1: Polypropylene, made by Prime Polymer Co., Ltd., trade name: "B205"

TPE1: Thermoplastic elastomer (polypropylene-α-olefin copolymer), made by Mitsui Chemicals, Inc., trade name: "Toughmer (registered trademark) XM7070"

TPE2: Thermoplastic elastomer (nanocrystalline structure-controlled polypropylene elastomer), made by Mitsui Chemicals, Inc., trade name: "NOTIO (registered trademark) PN-3050"

TPE3: Thermoplastic elastomer (nanocrystalline structure-controlled polypropylene elastomer), made by Mitsui Chemicals, Inc., trade name: "NOTIO (registered trademark) PN-2070"

TPE4: Thermoplastic elastomer (polyethylene-based elastomer), made by Mitsui Chemicals, Inc., trade name: "Toughmer (registered trademark) A0585X"

Example 1-7

A plastic ampule for a storage amount of 2.5 mL and having the shape shown in FIG. 1 to FIG. 7 was manufactured by the blow-fill-seal method. 2.5 mL of physiological saline were filled and sealed inside the plastic ampule.

For forming the plastic ampule, a multilayer plastic material (total thickness: 520 μm) with a five-layer structure including an outer layer 20 (thickness: 150 μm) made of a mixed resin in which PP1 and TPE2 are mixed at a ratio of 3:2 (weight ratio), an adhesive layer 22 (thickness: 10 μm) made of a mixed resin in which PE6 and TPE4 are mixed at a ratio of 1:1 (weight ratio) and formed on one side surface of the outer layer 20, an intermediate layer 18 (thickness: 200 μm) made of COP1 (Tg: 70° C.) and laminated on the adhesive layer 22 side of the outer layer 20, an adhesive layer 21 (thickness: 10 μm) made of the mixed resin in which PE6 and TPE4 are mixed at a ratio of 1:1 (weight ratio) and formed on a surface of the intermediate layer 18 at the opposite side of the surface of lamination to the outer layer 20, and an inner layer 19 (thickness: 150 μm) made of the mixed resin in which PP1 and TPE2 are mixed at a ratio of 3:2 (weight ratio) and laminated on the adhesive layer 21 side of the intermediate layer 18 was used. In the mixed resins, a nucleating agent (sodium 2,2'-methylene-bis-(4,6-di-tert-butylphenyl)phosphate, made by ADEKA Corp., product name: "Adekastab NA-11") was compounded at a proportion of 0.2 weight % with respect to the entirety of the mixed resin.

Example 1-8

Besides respectively using layers (thickness: 150 μm) formed of a mixed resin, in which PP1 and TPE3 are mixed at a ratio of 4:1 (weight ratio), in place of the layers formed of the mixed resin containing PP1 and TPE2 as the outer layer 20 and the inner layer 19, a plastic ampule with physiological saline filled and sealed therein was manufactured in the same manner as in Example 1-7.

Example 1-9

Besides respectively using layers (thickness: 150 μm) formed of a mixed resin, in which PP1 and TPE1 are mixed at a ratio of 9:1 (weight ratio), in place of the layers formed of the mixed resin containing PP1 and TPE2 as the outer layer 20 and the inner layer 19, a plastic ampule with physiological saline filled and sealed therein was manufactured in the same manner as in Example 1-7.

The layer arrangements of the plastic ampules manufactured in Examples 1-7 to 1-9 are shown in Table 3.

TABLE 3

| | Outer layer 20 | Adhesive layer 22 | Intermediate layer 18 | Adhesive layer 21 | Inner layer 19 | Total thickness (μm) |
|---|---|---|---|---|---|---|
| Example 1-7 | PP1 + TPE2 (3:2) 150 μm | PE6 + TPE4 (1:1) 10 μm | COP1 200 μm | PE6 + TPE4 (1:1) 10 μm | PP1 + TPE2 (3:2) 150 μm | 520 |
| Example 1-8 | PP1 + TPE3 (4:1) 150 μm | PE6 + TPE4 (1:1) 10 μm | COP1 200 μm | PE6 + TPE4 (1:1) 10 μm | PP1 + TPE3 (4:1) 150 μm | 520 |
| Example 1-9 | PP1 + TPE1 (9:1) 150 μm | PE6 + TPE4 (1:1) 10 μm | COP1 200 μm | PE6 + TPE4 (1:1) 10 μm | PP1 + TPE1 (9:1) 150 μm | 520 |

(2) Evaluation of Opening Property of Plastic Ampules

With each of the plastic ampules manufactured in Examples 1-7 to 1-9 and having physiological saline filled and sealed therein, the same opening property evaluation was performed as described above. As results, with all of Examples 1-7 to 1-9, the force necessary for opening the plastic ampule 10 (for tearing open the fragile part 14) could be set to a small value of no more than 0.40 N·m (no more than 0.65N·m/mm with respect to the thickness of the multilayer plastic material in the drug solution discharge tube 12). Also, after opening, liquid leakage from between the opening of the drug solution discharge tube 12 and the nozzle of the syringe was not observed.

<Manufacture of Colored Plastic Ampules and Evaluation of Physical Properties>

The resin materials, pigment, and ultraviolet absorber used in Examples 2-1 to 2-54 and Comparative Examples 2-1 to 2-19 described below are as follows.

PE1: High-pressure low-density polyethylene, density: 0.928 g/cm$^3$, made by Ube-Maruzen Polyethylene Co., Ltd., trade name: "UBE polyethylene (registered trademark) B128H"

PE4: High-density polyethylene, density: 0.940 g/cm$^3$, made by Prime Polymer Co., Ltd., trade name: "Ultzex (registered trademark) Uz4020B"

PE5: High-density polyethylene, density: 0.965 g/$cm^3$, made by Prime Polymer Co., Ltd., trade name: "Neozex (registered trademark) Nz65150B"

PE7: Adhesive low-density polyethylene, density: 0.903 g/$cm^3$, made by Prime Polymer Co., Ltd., trade name: "Evolue (registered trademark) SP0510B"

PP1: Polypropylene, made by Prime Polymer Co., Ltd., trade name: "B205"

PP2: Polyolefin-based thermoplastic elastomer, made by Mitsui Chemicals, Inc., trade name: "NOTIO (registered trademark) PN-3050," same as TPE2.

PP3: Polyolefin-based thermoplastic elastomer, made by Mitsui Chemicals, Inc., trade name: "Toughmer (registered trademark) XM7070," same as TPE1.

COC1: Cyclic olefin copolymer (ethylene-tetracyclododecene-based copolymer), Tg: 70° C., made by Mitsui Chemicals, Inc., trade name: "APEL (registered trademark) APL8008T"

COP1: Cyclic olefin-based polymer (hydrogenate of a norbornene-based ring-opened polymer), Tg: 70° C., made by Zeon Corp., trade name: "Zeonoa (registered trademark) 750R"

Pigment: Yellow pigment, C. I. pigment yellow 95

Ultraviolet absorber: made by Ciba Specialty Chemicals Inc., trade name: "Tinuvin (registered trademark) 326,"

Examples 2-1 to 2-8 and Comparative Examples 2-1 to 2-4

(1) Manufacture of Ample

Ampules (for an internal volume of 2.5 mL) having the shape shown in FIG. 8 was manufactured by the blow-fill-seal method from thermoplastic multilayer plastic materials with the layer arrangements shown in Table 4 or Table 5. 2.5 mL of a 0.8% (w/v) aqueous solution of sodium ozagrel were filled and sealed inside each ampule.

The thicknesses of the respective layers of the thermoplastic multilayer plastic materials shown in Table 4 are the thicknesses at a main body part (drug solution storage portion) of the ampule. Also, with all of Examples 2-1 to 2-8 and Comparative Examples 2-1 to 2-4, polyethylene layers, each formed of PE7 and having a thickness of 20 μm, were disposed as adhesive layers respectively between the outer layer and the intermediate layer and between the intermediate layer and the inner layer.

TABLE 4

| | Outer layer (colored layer) | Intermediate layer | Inner layer | Total thickness |
|---|---|---|---|---|
| Example 2-1 | PE1<br>T = 100 μm<br>P = 0.63%, PT = 63<br>U = 0.4%, UT = 40<br>U/T = 0.004 | COC1<br>200 μm | PE1<br>300 μm | 640 μm |
| Example 2-2 | PE1<br>T = 200 μm<br>P = 0.06%, PT = 12<br>U = 0.24%, UT = 48<br>U/T = 0.0012 | COP1<br>200 μm | PE1<br>200 μm | 640 μm |
| Example 2-3 | PE1<br>T = 300 μm<br>P = 0.04%, PT = 12<br>U = 0.12%, UT = 36<br>U/T = 0.0004 | COC1 + PE4<br>(9:1)<br>200 μm | PE1<br>100 μm | 640 μm |
| Example 2-4 | PE1<br>T = 50 μm<br>P = 2.5%, PT = 125<br>U = 0.1%, UT = 5<br>U/T = 0.002 | COP1 + PE4<br>(3:1)<br>200 μm | PE1<br>300 μm | 590 μm |
| Example 2-5 | PE1<br>T = 300 μm<br>P = 0.04%, PT = 12<br>U = 0.4%, UT = 120<br>U/T = 0.0013 | COP1 + PE4<br>(4:1)<br>200 μm | PE1<br>100 μm | 640 μm |
| Example 2-6 | PE1<br>T = 100 μm<br>P = 0.04%, PT = 4<br>U = 0.38%, UT = 38<br>U/T = 0.0038 | COC1<br>200 μm | PE1<br>200 μm | 540 μm |
| Example 2-7 | PP1 + PP2 (8:2)<br>T = 200 μm<br>P = 0.13%, PT = 26<br>U = 0.4%, UT = 80<br>U/T = 0.002 | COC1<br>200 μm | PP1 + PP2<br>(8:2)<br>200 μm | 640 μm |
| Example 2-8 | PP1 + PP3 (8:2)<br>T = 100 μm<br>P = 0.13%, PT = 13<br>U = 0.4%, UT = 40<br>U/T = 0.004 | COP1 + PE4<br>(4:1)<br>250 μm | PP1 + PP3<br>(8:2)<br>250 μm | 640 μm |

TABLE 5

| | Outer layer (colored layer) | Intermediate layer | Inner layer | Total thickness |
|---|---|---|---|---|
| Comparative Example 2-1 | PE1<br>T = 40 μm<br>P = 0.13%, PT = 5.2<br>U = 0.1%, UT = 4<br>U/T = 0.0025 | COC1<br>200 μm | PE1<br>360 μm | 640 μm |
| Comparative Example 2-2 | PE1<br>T = 100 μm<br>P = 0.1%, PT = 10<br>U = 0.5%, UT = 50<br>U/T = 0.005 | COC1<br>200 μm | PE1<br>300 μm | 640 μm |
| Comparative Example 2-3 | PE1<br>T = 100 μm<br>P = 2.6%, PT = 260<br>U = 0.2%, UT = 20<br>U/T = 0.002 | COC1<br>200 μm | PE1<br>300 μm | 640 μm |
| Comparative Example 2-4 | PE1<br>T = 100 μm<br>P = 0.0035%, PT = 0.35<br>U = 0.13%, UT = 13<br>U/T = 0.0013 | COC1<br>200 μm | PE1<br>300 μm | 640 μm |

In Table 4, Table 5, and the tables shown below, the abbreviations given above are used to indicate the resin materials forming the respective layers. For layers formed of mixed resins, abbreviations of the resin materials are joined by "+," for example as in "COC1+PE4." The ratio in parenthesis indicated next to the abbreviations indicating the mixed resin is the mixing ratio (weight ratio) of the mixed resin. For example, "COC1+PE4 (9:1)" indicates that the mixed resin in which COC1 and PE4 are mixed at the weight ratio of 9:1 is used.

Also, following the resin material (mixing ratio of the mixed resin) forming each layer, the thickness (μm) of the corresponding layer is indicated. For example, "PE1 100 μm" indicates that the corresponding layer is a layer of 100 μm thickness formed of "PE1."

Also, in Table 4, Table 5, and the tables shown below, "P" and "PT" respectively indicate the content proportion P (weight %) of the pigment and the product of the content proportion P (weight %) of the pigment and the thickness T (μm) of the corresponding colored layer. "U," "UT," and "U/T," respectively indicate the content proportion U (weight %) of the ultraviolet absorber, the product of the content proportion U (weight %) of the ultraviolet absorber and the thickness T (μm), and the quotient of the content proportion U (weight %) of the ultraviolet absorber divided by the thickness T (μm) of the corresponding colored layer.

(2) Observation of Changes of Outer Appearance of the Ampule

With each of the ampules of Examples 2-1 to 2-8 and Comparative Examples 2-1 to 2-4 shown in Table 4 and Table 5, the outer appearance of the ampule was checked after leaving in room temperature for 14 days (check of bleeding).

The results are shown in Table 6 below. With the ampule of Comparative Example 2, the ultraviolet absorber bled from the main container body and a fine powder of white color was observed on the container surface.

(3) Measurement of Content Proportion of Cis-Isomer

With each of the ampules of the examples and comparative examples (with the exception of Comparative Example 2-2 with which bleeding of the ultraviolet absorber occurred), the content proportion of a cis-isomer that is a substance related to sodium ozagrel was measured using high-performance liquid chromatography (HPLC) after leaving the ampule for 25 days under a light source with an illuminance of 20001× (D65 lamp).

The measurement was made as follows. First, 2.5 mL of the sample was collected, diluted to a total volume of 40 mL with the mobile phase, and this was used as the sample solution. 5 μL of the sample solution was sampled and analyzed by the HPLC method under the conditions indicated below. Respective peak areas of each sample solution were determined by an automatic integration method and the amount of the cis-isomer that is the substance related to sodium ozagrel was determined by an area percentage method.

The HPLC measurement conditions are as follows.

Measurement wavelength: 220 nm

Column: YMC-Pack ODS-A A-302, 150×4.6 mm I.D., S-5 μm

Column temperature: approx. 25° C.

Mobile phase: mixed solution of 0.3% ammonium acetate solution/methanol (4:1)

Flow rate: 1.0 ml/minute

Measurement time: 20 minutes

The measurement results are shown in Table 6. As a result of the analysis, an ampule for which the content proportion of the cis-isomer exceeded 0.3% was judged to be failing.

(4) Measurement of Light Transmittance

From the drug solution storage part of each of the ampules of the examples and comparative examples (with the exception of Comparative Example 2-2 with which bleeding of the ultraviolet absorber occurred), a sample for light transmittance measurement was cut out, and using this sample, the transmittance of light rays of 200 to 380 nm wavelength and the transmittance of light rays of 600 nm were measured with a spectrophotometer.

Also, as a control, a brown-colored glass ampule (for an internal volume of 2.5 ml) filled with 2.5 ml of the 0.8% (w/v) aqueous solution of sodium ozagrel was left for 14 days under room temperature and the content proportion of the cis-isomer after leaving was measured in the same manner as the above.

The measurement results are shown in Table 6 below.

TABLE 6

| | Outer appearance of ampule (observation of bleeding) | Content proportion of cis-isomer | Light transmittance 200-380 nm | Light transmittance 600 nm |
|---|---|---|---|---|
| Example 2-1 | not observed | 0.02% | 0.1% max. | 49% |
| Example 2-2 | not observed | 0.12% | 2.5% max. | 62% |
| Example 2-3 | not observed | 0.16% | 3.8% max. | 63% |
| Example 2-4 | not observed | 0.05% | 0.9% max. | 41% |
| Example 2-5 | not observed | 0.05% | 0.2% max. | 56% |
| Example 2-6 | not observed | 0.1% | 3.8% max. | 64% |
| Example 2-7 | not observed | 0.02% | 0.5% max. | 53% |
| Example 2-8 | not observed | 0.06% | 1.8% max. | 63% |
| Comparative Example 2-1 | not observed | 1.3% | 19% max. | 74% |
| Comparative Example 2-2 | observed | — | — | — |
| Comparative Example 2-3 | not observed | 0.02% | 0.1% max. | 26% |
| Comparative Example 2-4 | not observed | 0.60% | 7.5% max. | 69% |
| Control | | 0.15% | — | — |

As shown in Table 6, whereas results equivalent to or better than those of the brown glass ampule used as the control were obtained in regard to the amount of increase of the cis-isomer with the ampules of Examples 2-1 to 2-8, with the ampules of Comparative Examples 2-1 to 2-4, the cis-isomer content became no less than three times that of the brown glass ampule used as the control.

Meanwhile, with the ampule of Comparative Example 2-3, the transmittance of light rays of 600 nm was low and it was difficult to visually observe the contained solution.

Examples 2-9 to 2-16

In the same manner as in Example 2-1, 2.5 ml storage ampules of the shape shown in FIG. 8 were manufactured by the blow-fill-seal method from the thermoplastic multilayer plastic materials with the layer arrangements shown in Table 7. The interior of each ampule was filled with 2.5 ml of the 0.8% (w/v) aqueous solution of sodium ozagrel.

TABLE 7

| | Outer layer (colored layer) | Intermediate layer | Inner layer | Total thickness |
|---|---|---|---|---|
| Example 2-9 | PE1<br>T = 100 μm<br>P = 0.63%, PT = 63<br>U = 0.4%, UT = 40<br>U/T = 0.004 | COC1 + PE5<br>(4:1)<br>200 μm | PE1<br>300 μm | 640 μm |
| Example 2-10 | PE1<br>T = 200 μm<br>P = 0.06%, PT = 12<br>U = 0.24%, UT = 48<br>U/T = 0.0012 | COP1 + PE5<br>(4:1)<br>200 μm | PE1<br>200 μm | 640 μm |
| Example 2-11 | PE1<br>T = 300 μm<br>P = 0.04%, PT = 12<br>U = 0.12%, UT = 36<br>U/T = 0.0004 | COC1 + PE5<br>(4:1)<br>200 μm | PE1<br>100 μm | 640 μm |
| Example 2-12 | PE1<br>T = 50 μm<br>P = 2.5%, PT = 125<br>U = 0.1%, UT = 5<br>U/T = 0.002 | COP1 + PE5<br>(4:1)<br>200 μm | PE1<br>300 μm | 590 μm |
| Example 2-13 | PE1<br>T = 300 μm<br>P = 0.04%, PT = 12<br>U = 0.4%, UT = 120<br>U/T = 0.0013 | COP1 + PE5<br>(4:1)<br>200 μm | PE1<br>100 μm | 640 μm |
| Example 2-14 | PE1<br>T = 100 μm<br>P = 0.04%, PT = 4<br>U = 0.38%, UT = 38<br>U/T = 0.0038 | COC1 + PE5<br>(4:1)<br>200 μm | PE1<br>200 μm | 540 μm |
| Example 2-15 | PP1 + PP2 (8:2)<br>T = 200 μm<br>P = 0.13%, PT = 26<br>U = 0.4%, UT = 80<br>U/T = 0.002 | COP1 + PE5<br>(4:1)<br>200 μm | PP1 + PP2<br>(8:2)<br>200 μm | 640 μm |
| Example 2-16 | PP1 + PP3 (8:2)<br>T = 100 μm<br>P = 0.13%, PT = 13<br>U = 0.4%, UT = 40<br>U/T = 0.004 | COP1 + PE5<br>(4:1)<br>250 μm | PP1 + PP3<br>(8:2)<br>250 μm | 640 μm |

With Examples 2-9 to 2-16, the material forming the intermediate layer in Examples 2-1 to 2-8 is changed to a mixed resin of COC1 or COP1 and PE5 (weight ratio: 4:1).

As a result of observing changes of the outer appearances of the ampules of Examples 2-9 to 2-16 in the same manner as described in (2), bleeding of the ultraviolet absorber from the main container body was not observed in any of the examples.

Examples 2-17 and 2-18

In the same manner as in Example 2-1, 2.5 ml storage ampules of the shape shown in FIG. 8 were manufactured by the blow-fill-seal method from the thermoplastic multilayer plastic materials with the layer arrangements shown in Table 8. The interior of each ampule was filled with 2.5 ml of the 0.8% (w/v) aqueous solution of sodium ozagrel.

Then, with the ampules of Examples 2-17 and 2-18, observation of changes of the outer appearance of the ampule, measurement of the content proportion of the cis-isomer, and measurement of the light transmittance were performed in the same manner as described in (2) to (4). The results are shown in Table 9.

TABLE 8

| | Outer layer | Intermediate layer (colored layer) | Inner layer | Total thickness |
|---|---|---|---|---|
| Example 2-17 | PE1<br>300 μm | PE1<br>T = 100 μm<br>P = 0.25%, PT = 25<br>U = 0.4%, UT = 40<br>U/T = 0.004 | COP1<br>200 μm | 640 μm |
| Example 2-18 | PE1<br>50 μm | PE1<br>T = 400 μm<br>P = 0.01%, PT = 4<br>U = 0.15%, UT = 60<br>U/T = 0.000375 | COP1<br>200 μm | 690 μm |

TABLE 9

| | Outer appearance of ampule (observation of bleeding) | Content proportion of cis-isomer | Light transmittance 200-380 nm | Light transmittance 600 nm |
|---|---|---|---|---|
| Example 2-17 | not observed | 0.04% | 0.8% max. | 58% |
| Example 2-18 | not observed | 0.02% | 0.1% max. | 65% |
| Control | — | 0.15% | — | — |

As shown in Table 9, it was found that Examples 2-17 and 2-18 exhibit the same performance as Examples 2-1 to 2-8.

Examples 2-19 to 2-24 and Comparative Examples 2-5 to 2-10

In the same manner as in Example 2-1, 2.5 ml storage ampules of the shape shown in FIG. 8 were manufactured by the blow-fill-seal method from the thermoplastic multilayer plastic materials with the layer arrangements shown in Table 10 or Table 11. The interior of each ampule was filled with 2.5 ml of the 0.8% (w/v) aqueous solution of sodium ozagrel.

Then, with the ampules of Examples 2-19 to 2-14, observation of changes of the outer appearance of the ampule, measurement of the content proportion of the cis-isomer, and measurement of the light transmittance were performed in the same manner as described in (2) to (4). The results are shown in Table 12.

TABLE 10

| | Outer layer (colored layer) | Intermediate layer | Inner layer | Total thickness |
|---|---|---|---|---|
| Example 2-19 | PE1<br>T = 400 μm<br>P = 0.06%, PT = 24<br>U = 0.05%, UT = 20<br>U/T = 0.000125 | COC1<br>150 μm | PE1<br>50 μm | 640 μm |
| Comparative Example 2-5 | PE1<br>T = 400 μm<br>P = 0.0375%, PT = 15<br>U = 0.05%, UT = 20<br>U/T = 0.000125 | COC1<br>150 μm | PE1<br>50 μm | 640 μm |
| Example 2-20 | PE1<br>T = 400 μm<br>P = 0.35%, PT = 140<br>U = 0.05%, UT = 20<br>U/T = 0.000125 | COC1 + PE4<br>(9:1)<br>150 μm | PE1<br>50 μm | 640 μm |
| Comparative Example 2-6 | PE1<br>T = 400 μm<br>P = 0.45%, PT = 180<br>U = 0.05%, UT = 20<br>U/T = 0.000125 | COC1 + PE4<br>(9:1)<br>150 μm | PE1<br>50 μm | 640 μm |
| Example 2-21 | PE1<br>T = 200 μm<br>P = 0.11%, PT = 22<br>U = 0.1%, UT = 20<br>U/T = 0.0005 | COC1<br>200 μm | PE1<br>200 μm | 640 μm |
| Comparative Example 2-7 | PE1<br>T = 200 μm<br>P = 0.075%, PT = 15<br>U = 0.1%, UT = 20<br>U/T = 0.0005 | COC1<br>200 μm | PE1<br>200 μm | 640 μm |

TABLE 11

| | Outer layer (colored layer) | Intermediate layer | Inner layer | Total thickness |
|---|---|---|---|---|
| Example 2-22 | PE1<br>T = 200 μm<br>P = 0.7%, PT = 140<br>U = 0.1%, UT = 20<br>U/T = 0.0005 | COC1 + PE4<br>(9:1)<br>200 μm | PE1<br>200 μm | 640 μm |
| Comparative Example 2-8 | PE1<br>T = 200 μm<br>P = 1.0%, PT = 200<br>U = 0.1%, UT = 20<br>U/T = 0.0005 | COC1 + PE4<br>(9:1)<br>200 μm | PE1<br>200 μm | 640 μm |
| Example 2-23 | PE1<br>T = 100 μm<br>P = 0.25%, PT = 25<br>U = 0.2%, UT = 20<br>U/T = 0.002 | COC1<br>200 μm | PE1<br>300 μm | 640 μm |
| Comparative Example 2-9 | PE1<br>T = 100 μm<br>P = 0.15%, PT = 15<br>U = 0.2%, UT = 20<br>U/T = 0.002 | COC1<br>200 μm | PE1<br>300 μm | 640 μm |
| Example 2-24 | PE1<br>T = 100 μm<br>P = 1.5%, PT = 150<br>U = 0.2%, UT = 20<br>U/T = 0.002 | COC1 + PE4<br>(9:1)<br>200 μm | PE1<br>300 μm | 640 μm |
| Comparative Example 2-10 | PE1<br>T = 100 μm<br>P = 1.8%, PT = 180<br>U = 0.2%, UT = 20<br>U/T = 0.002 | COC1 + PE4<br>(9:1)<br>200 μm | PE1<br>300 μm | 640 μm |

TABLE 12

| | Outer appearance of ampule (observation of bleeding) | Content proportion of cis-isomer | Light transmittance | |
|---|---|---|---|---|
| | | | 200-380 nm | 600 nm |
| Example 2-19 | not observed | 0.28% | 4.3% max. | 66% |
| Comparative Example 2-5 | not observed | 0.38% | 5.3% max. | 66% |
| Example 2-20 | not observed | 0.02% | less than 0.1% max. | 42% |
| Comparative Example 2-6 | not observed | — | less than 0.1% max. | 27% |
| Example 2-21 | not observed | 0.29% | 4.3% max. | 69% |
| Comparative Example 2-7 | not observed | 0.40% | 5.5% max. | 66% |
| Example 2-22 | not observed | 0.03% | 0.3% max. | 43% |
| Comparative Example 2-8 | not observed | — | less than 0.1% max. | 24% |
| Example 2-23 | not observed | 0.29% | 4.5% max. | 68% |
| Comparative Example 2-9 | not observed | 0.41% | 5.7% max. | 66% |
| Example 2-24 | not observed | 0.03% | less than 0.1% max. | 40% |

TABLE 12-continued

| | Outer appearance of ampule (observation of bleeding) | Content proportion of cis-isomer | Light transmittance | |
|---|---|---|---|---|
| | | | 200-380 nm | 600 nm |
| Comparative Example 2-10 | not observed | — | less than 0.1% max. | 28% |
| Control | — | 0.15% | — | — |

As shown in Table 12, whereas Examples 2-19 to 2-24, which satisfy Formula (1) and Formula (3), exhibited the same performance as Examples 2-1 to 2-8, with Comparative Examples 2-5 to 2-10, which do not satisfy Formula (3), the problem of the content proportion of the cis-isomer becoming high or the problem of the visible light transmittance becoming low and making visual observation of the contained solution difficult occurred.

Examples 2-25 to 2-30

In the same manner as in Example 2-1, 2.5 ml storage ampules of the shape shown in FIG. 8 were manufactured by the blow-fill-seal method from the thermoplastic multilayer plastic materials with the layer arrangements shown in Table 13. The interior of each ampule was filled with 2.5 ml of the 0.8% (w/v) aqueous solution of sodium ozagrel.

TABLE 13

| | Outer layer (colored layer) | Intermediate layer | Inner layer | Total thickness |
|---|---|---|---|---|
| Example 2-25 | PE1<br>T = 400 μm<br>P = 0.06%, PT = 24<br>U = 0.05%, UT = 20<br>U/T = 0.000125 | COC1 + PE5<br>(4:1)<br>150 μm | PE1<br>50 μm | 640 μm |
| Example 2-26 | PE1<br>T = 400 μm<br>P = 0.35%, PT = 140<br>U = 0.05%, UT = 20<br>U/T = 0.000125 | COC1 + PE5<br>(4:1)<br>150 μm | PE1<br>50 μm | 640 μm |
| Example 2-27 | PE1<br>T = 200 μm<br>P = 0.11%, PT = 22<br>U = 0.1%, UT = 20<br>U/T = 0.0005 | COC1 + PE5<br>(4:1)<br>200 μm | PE1<br>200 μm | 640 μm |
| Example 2-28 | PE1<br>T = 200 μm<br>P = 0.7%, PT = 140<br>U = 0.1%, UT = 20<br>U/T = 0.0005 | COC1 + PE5<br>(4:1)<br>200 μm | PE1<br>200 μm | 640 μm |
| Example 2-29 | PE1<br>T = 100 μm<br>P = 0.25%, PT = 25<br>U = 0.2%, UT = 20<br>U/T = 0.002 | COC1 + PE5<br>(4:1)<br>200 μm | PE1<br>300 μm | 640 μm |
| Example 2-30 | PE1<br>T = 100 μm<br>P = 1.5%, PT = 150<br>U = 0.2%, UT = 20<br>U/T = 0.002 | COC1 + PE5<br>(4:1)<br>200 μm | PE1<br>300 μm | 640 μm |

With Examples 2-25 to 2-30, the material forming the intermediate layer in Examples 2-19 to 2-24 is changed to a mixed resin of COC1 and PE5 (weight ratio: 4:1).

As a result of observing changes of the outer appearances of the ampules of Examples 2-25 to 2-30 in the same manner as described in (2), bleeding of the ultraviolet absorber from the main container body was not observed in any of the examples.

Examples 2-31 to 2-33 and Comparative Examples 2-11 to 2-13

In the same manner as in Example 2-1, 2.5 ml storage ampules of the shape shown in FIG. 8 were manufactured by the blow-fill-seal method from the thermoplastic multilayer plastic materials with the layer arrangements shown in Table 14. The interior of each ampule was filled with 2.5 ml of the 0.8% (w/v) aqueous solution of sodium ozagrel.

Then, with the ampules of Examples 2-31 to 2-33, observation of changes of the outer appearance of the ampule, measurement of the content proportion of the cis-isomer, and measurement of the light transmittance were performed in the same manner as described in (2) to (4). The results are shown in Table 15.

TABLE 14

| | Outer layer (colored layer) | Intermediate layer | Inner layer | Total thickness |
|---|---|---|---|---|
| Example 2-31 | PE1<br>T = 400 μm<br>P = 0.003%, PT = 1.2<br>U = 0.075%, UT = 30<br>U/T = 0.0001875 | COC1 + PE4<br>(9:1)<br>150 μm | PE1<br>50 μm | 640 μm |
| Comparative Example 2-11 | PE1<br>T = 400 μm<br>T = 0.001%, PT = 0.4<br>U = 0.075%, UT = 30<br>U/T = 0.0001875 | COC1 + PE4<br>(9:1)<br>150 μm | PE1<br>50 μm | 640 μm |
| Example 2-32 | PE1<br>T = 200 μm<br>P = 0.005%, PT = 1.0<br>U = 0.15%, UT = 30<br>U/T = 0.00075 | COC1 + PE4<br>(9:1)<br>200 μm | PE1<br>200 μm | 640 μm |
| Comparative Example 2-12 | PE1<br>T = 200 μm<br>P = 0.002%, PT = 0.4<br>U = 0.15%, UT = 30<br>U/T = 0.00075 | COC1 + PE4<br>(9:1)<br>200 μm | PE1<br>200 μm | 640 μm |

TABLE 14-continued

| | Outer layer (colored layer) | Intermediate layer | Inner layer | Total thickness |
|---|---|---|---|---|
| Example 2-33 | PE1<br>T = 100 μm<br>P = 0.015%, PT = 1.5<br>U = 0.3%, UT = 30<br>U/T = 0.003 | COC1 + PE4<br>(9:1)<br>200 μm | PE1<br>300 μm | 640 μm |
| Comparative Example 2-13 | PE1<br>T = 100 μm<br>P = 0.005%, PT = 0.5<br>U = 0.3%, UT = 30<br>U/T = 0.003 | COC1 + PE4<br>(9:1)<br>200 μm | PE1<br>300 μm | 640 μm |

TABLE 15

| | Outer appearance of ampule (observation of bleeding) | Content proportion of cis-isomer | Light transmittance 200-380 nm | Light transmittance 600 nm |
|---|---|---|---|---|
| Example 2-31 | not observed | 0.27% | 4.8% max. | 60% |
| Comparative Example 2-11 | not observed | 0.45% | 6.8% max. | 63% |
| Example 2-32 | not observed | 0.29% | 4.8% max. | 60% |
| Comparative Example 2-12 | not observed | 0.5% | 6.8% max. | 61% |
| Example 2-33 | not observed | 0.28% | 4.8% max. | 58% |
| Comparative Example 2-13 | not observed | 0.51% | 7.0% max. | 60% |
| Control | — | 0.15% | — | — |

As shown in Table 15, whereas Examples 2-31 to 2-33, which satisfy Formula (1) and Formula (2), exhibited the same performance as Examples 2-1 to 2-8, with Comparative Examples 2-11 to 2-13, which do not satisfy Formula (1), the problem of the content proportion of the cis-isomer becoming high or the problem of the visible light transmittance becoming low and making visual observation of the contained solution difficult occurred.

Examples 2-34 to 2-36

In the same manner as in Example 2-1, 2.5 ml storage ampules of the shape shown in FIG. 8 were manufactured by the blow-fill-seal method from the thermoplastic multilayer plastic materials with the layer arrangements shown in Table 16. The interior of each ampule was filled with 2.5 ml of the 0.8% (w/v) aqueous solution of sodium ozagrel.

TABLE 16

| | Outer layer (colored layer) | Intermediate layer | Inner layer | Total thickness |
|---|---|---|---|---|
| Example 2-34 | PE1<br>T = 400 μm<br>P = 0.003%, PT = 1.2<br>U = 0.075%, UT = 30<br>U/T = 0.0001875 | COC1 + PE5<br>(4:1)<br>150 μm | PE1<br>50 μm | 640 μm |
| Example 2-35 | PE1<br>T = 200 μm<br>P = 0.005%, PT = 1.0<br>U = 0.15%, UT = 30<br>U/T = 0.00075 | COC1 + PE5<br>(4:1)<br>200 μm | PE1<br>200 μm | 640 μm |
| Example 2-36 | PE1<br>T = 100 μm<br>P = 0.015%, PT = 1.5<br>U = 0.3%, UT = 30<br>U/T = 0.003 | COC1 + PE5<br>(4:1)<br>200 μm | PE1<br>300 μm | 640 μm |

With Examples 2-34 to 2-36, the material forming the intermediate layer in Examples 2-31 to 2-33 is changed to a mixed resin of COC1 and PE5 (weight ratio: 4:1).

As a result of observing changes of the outer appearances of the ampules of Examples 2-34 to 2-36 in the same manner as described in (2), bleeding of the ultraviolet absorber from the main container body was not observed in any of the examples.

Examples 2-37 to 2-42 and Comparative Examples 2-14 to 2-19

In the same manner as in Example 2-1, 2.5 ml storage ampules of the shape shown in FIG. 8 were manufactured by the blow-fill-seal method from the thermoplastic multilayer plastic materials with the layer arrangements shown in Table 17 or Table 18. The interior of each ampule was filled with 2.5 ml of the 0.8% (w/v) aqueous solution of sodium ozagrel.

Then, with the ampules of Examples 2-37 to 2-42, observation of changes of the outer appearance of the ampule, measurement of the content proportion of the cis-isomer, and measurement of the light transmittance were performed in the same manner as described in (2) to (4). The results are shown in Table 19.

TABLE 17

| | Outer layer (colored layer) | Intermediate layer | Inner layer | Total thickness |
|---|---|---|---|---|
| Example 2-37 | PE1<br>T = 400 μm<br>P = 0.1%, PT = 40<br>U = 0.013%, UT = 5.2<br>U/T = 0.0000325 | COC1 + PE4<br>(9:1)<br>150 μm | PE1<br>50 μm | 640 μm |
| Comparative Example 2-14 | PE1<br>T = 400 μm<br>P = 0.1%, PT = 40<br>U = 0.005%, UT = 2<br>U/T = 0.0000125 | COC1 + PE4<br>(9:1)<br>150 μm | PE1<br>50 μm | 640 μm |
| Example 2-38 | PE1<br>T = 400 μm<br>P = 0.1%, PT = 40<br>U = 0.4%, UT = 160<br>U/T = 0.001 | COC1 + PE4<br>(9:1)<br>150 μm | PE1<br>50 μm | 640 μm |
| Comparative Example 2-15 | PE1<br>T = 400 μm<br>P = 0.1%, PT = 40<br>U = 0.5%, UT = 200<br>U/T = 0.00125 | COC1 + PE4<br>(9:1)<br>150 μm | PE1<br>50 μm | 640 μm |
| Example 2-39 | PE1<br>T = 250 μm<br>P = 0.16%, PT = 40<br>U = 0.02%, UT = 5<br>U/T = 0.00008 | COC1 + PE4<br>(9:1)<br>200 μm | PE1<br>150 μm | 640 μm |
| Comparative Example 2-16 | PE1<br>T = 250 μm<br>P = 0.16%, PT = 40<br>U = 0.01%, UT = 2.5<br>U/T = 0.00004 | COC1 + PE4<br>(9:1)<br>200 μm | PE1<br>150 μm | 640 μm |

TABLE 18

| | Outer layer (colored layer) | Intermediate layer | Inner layer | Total thickness |
|---|---|---|---|---|
| Example 2-40 | PE1<br>T = 250 μm<br>P = 0.16%, PT = 40<br>U = 0.6%, UT = 150<br>U/T = 0.0024 | COC1 + PE4<br>(9:1)<br>200 μm | PE1<br>150 μm | 640 μm |
| Comparative Example 2-17 | PE1<br>T = 250 μm<br>P = 0.16%, PT = 40<br>U = 0.8%, UT = 200<br>U/T = 0.0032 | COC1 + PE4<br>(9:1)<br>200 μm | PE1<br>150 μm | 640 μm |
| Example 2-41 | PE1<br>T = 200 μm<br>P = 0.2%, PT = 40<br>U = 0.03%, UT = 6<br>U/T = 0.00015 | COC1 + PE4<br>(9:1)<br>200 μm | PE1<br>200 μm | 640 μm |
| Comparative Example 2-18 | PE1<br>T = 200 μm<br>P = 0.2%, PT = 40<br>U = 0.01%, UT = 2<br>U/T = 0.00005 | COC1 + PE4<br>(9:1)<br>200 μm | PE1<br>200 μm | 640 μm |

TABLE 18-continued

| | Outer layer (colored layer) | Intermediate layer | Inner layer | Total thickness |
|---|---|---|---|---|
| Example 2-42 | PE1<br>T = 200 μm<br>P = 0.2%, PT = 40<br>U = 0.7%, UT = 140<br>U/T = 0.0035 | COC1 + PE4<br>(9:1)<br>200 μm | PE1<br>200 μm | 640 μm |
| Comparative Example 2-19 | PE1<br>T = 200 μm<br>P = 0.2%, PT = 40<br>U = 1%, UT = 200<br>U/T = 0.005 | COC1 + PE4<br>(9:1)<br>200 μm | PE1<br>200 μm | 640 μm |

TABLE 19

| | Outer appearance of ampule (observation of bleeding) | Content proportion of cis-isomer | Light transmittance | |
|---|---|---|---|---|
| | | | 200-380 nm | 600 nm |
| Example 2-37 | not observed | 0.25% | 4.7% max. | 58% |
| Comparative Example 2-14 | not observed | 0.32% | 5.5% max. | 56% |
| Example 2-38 | not observed | 0.02% | less than 0.1% max. | 57% |
| Comparative Example 2-15 | not observed | 0.02% | less than 0.1% max. | 57% |
| Example 2-39 | not observed | 0.27% | 4.8% max. | 56% |
| Comparative Example 2-16 | not observed | 0.33% | 5.4% max. | 53% |
| Example 2-40 | not observed | 0.02% | less than 0.1% max. | 56% |
| Comparative Example 2-17 | not observed | 0.02% | less than 0.1% max. | 53% |
| Example 2-41 | not observed | 0.26% | 4.8% max. | 53% |
| Comparative Example 2-18 | not observed | 0.5% | 7.9% max. | 54% |
| Example 2-42 | not observed | 0.02% | less than 0.1% max. | 52% |

TABLE 19-continued

| | Outer appearance of ampule (observation of bleeding) | Content proportion of cis-isomer | Light transmittance | |
|---|---|---|---|---|
| | | | 200-380 nm | 600 nm |
| Comparative Example 2-19 | observed | — | — | — |
| Control | — | 0.15% | — | — |

As shown in Table 19, whereas Examples 2-37 to 2-42, which satisfy Formula (1) and Formula (2), exhibited the same performance as Examples 2-1 to 2-8, with Comparative Examples 2-14 to 2-19, which do not satisfy Formula (2), the problem of the content proportion of the cis-isomer becoming high or the problem of the visible light transmittance becoming low and making visual observation of the contained solution difficult occurred.

Examples 2-43 to 2-48

In the same manner as in Example 2-1, 2.5 ml storage ampules of the shape shown in FIG. 8 were manufactured by the blow-fill-seal method from the thermoplastic multilayer plastic materials with the layer arrangements shown in Table 20. The interior of each ampule was filled with 2.5 ml of the 0.8% (w/v) aqueous solution of sodium ozagrel.

TABLE 20

| | Outer layer (colored layer) | Intermediate layer | Inner layer | Total thickness |
|---|---|---|---|---|
| Example 2-43 | PE1<br>T = 400 μm<br>P = 0.1%, PT = 40<br>U = 0.013%, UT = 5.2<br>U/T = 0.0000325 | COC1 + PE5<br>(4:1)<br>150 μm | PE1<br>50 μm | 640 μm |
| Example 2-44 | PE1<br>T = 400 μm<br>P = 0.1%, PT = 40<br>U = 0.4%, UT = 160<br>U/T = 0.001 | COC1 + PE5<br>(4:1)<br>150 μm | PE1<br>50 μm | 640 μm |
| Example 2-45 | PE1<br>T = 250 μm<br>P = 0.16%, PT = 40<br>U = 0.02%, UT = 5<br>U/T = 0.00008 | COC1 + PE5<br>(4:1)<br>200 μm | PE1<br>150 μm | 640 μm |

TABLE 20-continued

| | Outer layer (colored layer) | Intermediate layer | Inner layer | Total thickness |
|---|---|---|---|---|
| Example 2-46 | PE1<br>T = 250 μm<br>P = 0.16%, PT = 40<br>U = 0.6%, UT = 150<br>U/T = 0.0024 | COC1 + PE5<br>(4:1)<br>200 μm | PE1<br>150 μm | 640 μm |
| Example 2-47 | PE1<br>T = 200 μm<br>P = 0.2%, PT = 40<br>U = 0.03%, OT = 6<br>U/T = 0.00015 | COC1 + PE5<br>(4:1)<br>200 μm | PE1<br>200 μm | 640 μm |
| Example 2-48 | PE1<br>T = 200 μm<br>P = 0.2%, PT = 40<br>U = 0.7%, UT = 140<br>U/T = 0.0035 | COC1 + PE5<br>(4:1)<br>200 μm | PE1<br>200 μm | 640 μm |

With Examples 2-43 to 2-48, the material forming the intermediate layer in Examples 2-37 to 2-42 is changed to a mixed resin of COC1 and PE5 (weight ratio: 4:1).

As a result of observing changes of the outer appearances of the ampules of Examples 2-43 to 2-48 in the same manner as described in (2), bleeding of the ultraviolet absorber from the main container body was not observed in any of the examples.

Examples 2-49 to 2-51

In the same manner as in Example 2-1, 2.5 ml storage ampules of the shape shown in FIG. 8 were manufactured by the blow-fill-seal method from the thermoplastic multilayer plastic materials with the layer arrangements shown in Table 21. The interior of each ampule was filled with 2.5 ml of the 0.8% (w/v) aqueous solution of sodium ozagrel.

Then, with the ampules of Examples 2-49 to 2-51, observation of changes of the outer appearance of the ampule, measurement of the content proportion of the cis-isomer, and measurement of the light transmittance were performed in the same manner as described in (2) to (4). The results are shown in Table 22.

TABLE 21

| | Outer layer (colored layer) | Intermediate layer | Inner layer | Total thickness |
|---|---|---|---|---|
| Example 2-49 | PE1<br>T = 50 μm<br>P = 3, PT = 150<br>U = 0.2%, UT = 10<br>U/T = 0.004 | COP1<br>250 μm | PE1<br>300 μm | 640 μm |
| Example 2-50 | PE1<br>T = 100 μm<br>P = 1.5%, PT = 150<br>U = 0.4%, UT = 40<br>U/T = 0.004 | COP1<br>200 μm | PE1<br>300 μm | 640 μm |
| Example 2-51 | PE1<br>T = 200 μm<br>P = 0.75%, PT = 150<br>U = 0.7%, UT = 140<br>U/T = 0.0035 | COP1<br>200 μm | PE1<br>200 μm | 640 μm |

TABLE 22

| | Outer appearance of ampule (observation of bleeding) | Content proportion of cis-isomer | Light transmittance 200-380 nm | 600 nm |
|---|---|---|---|---|
| Example 2-49 | not observed | 0.05% | 0.9% max. | 41% |
| Example 2-50 | not observed | 0.03% | 0.1% max. | 42% |
| Example 2-51 | not observed | 0.02% | less than 0.1% max. | 43% |
| Control | — | 0.15% | — | — |

As shown in Table 22, Examples 2-49 to 2-51, which satisfy Formula (1) and Formula (2), exhibited the same performance as Examples 2-1 to 2-8.

Examples 2-52 to 2-54

In the same manner as in Example 2-1, 2.5 ml storage ampules of the shape shown in FIG. 8 were manufactured by the blow-fill-seal method from the thermoplastic multilayer plastic materials with the layer arrangements shown in Table 23. The interior of each ampule was filled with 2.5 ml of the 0.8% (w/v) aqueous solution of sodium ozagrel.

TABLE 23

| | Outer layer (colored layer) | Intermediate layer | Inner layer | Total thickness |
|---|---|---|---|---|
| Example 2-52 | PE1<br>T = 50 μm<br>P = 3, PT = 150<br>U = 0.2%, UT = 10<br>U/T = 0.004 | COP1 + PE5<br>(4:1)<br>250 μm | PE1<br>300 μm | 640 μm |
| Example 2-53 | PE1<br>T = 100 μm<br>P = 1.5%, PT = 150<br>U = 0.4%, UT = 40<br>U/T = 0.004 | COP1 + PE5<br>(4:1)<br>200 μm | PE1<br>300 μm | 640 μm |
| Example 2-54 | PE1<br>T = 200 μm<br>P = 0.75%, PT = 150<br>U = 0.7%, UT = 140<br>U/T = 0.0035 | COP1 + PE5<br>(4:1)<br>200 μm | PE1<br>200 μm | 640 μm |

With Examples 2-52 to 2-54, the material forming the intermediate layer in Examples 2-49 to 2-51 is changed to a mixed resin of COP1 and PE5 (weight ratio: 4:1).

As a result of observing changes of the outer appearances of the ampules of Examples 2-52 to 2-54 in the same manner as described in (2), bleeding of the ultraviolet absorber from the main container body was not observed in any of the examples.

Although the present invention was presented above by way of the illustrative embodiments of the present invention, these are simply examples and must not be interpreted restrictively. Modification examples of the present invention that are obvious to those skilled in the field of the art of the invention are included within the scope of the claims given below.

Industrial Applicability

The plastic ampule according to the present invention is favorable, for example, as a plastic ampule for storing and sealing a drug solution in a sterile manner, and is especially favorable as a plastic ampule formed by the blow-fill-seal method.

Also, the colored plastic container according to the present invention is favorable as a plastic container for efficiently blocking entry of light rays of the ultraviolet region from the exterior to the interior of the container while maintaining an appropriate visibility with respect to the interior of the container, and is especially favorable as a plastic container for storing a drug agent that is readily decomposed or degraded by ultraviolet rays.

What is claimed is:

1. A plastic ampule comprising:

a drug solution storage part for storing a drug solution; a drug solution discharge tube in communication with the drug solution storage part and extending toward one side; and a top part closing an end at the one side of the drug solution discharge tube; and wherein the drug solution discharge tube comprises a fragile part formed to have a thin thickness along a circumferential direction, and the drug solution storage part, the drug solution discharge tube, and the top part are made of a multilayer plastic material comprising an intermediate layer, containing a cyclic olefin-based (co)polymer with a glass transition temperature of 60 to 80° C., an inner layer laminated to an inner side of the intermediate layer, and an outer layer laminated to an outer side of the intermediate layer.

2. The plastic ampule according to claim 1 wherein, the multilayer plastic material comprises adhesive layers respectively disposed between the intermediate layer and the inner layer and between the intermediate layer and the outer layer.

3. The plastic ampule according to claim 1 further comprising: a tab that continues from an outer peripheral surface of the drug solution discharge tube at a top part side relative to the fragile part and protrudes to an outer side of the drug solution discharge tube or a tab that continues from an outer surface of the top part and protrudes to an outer side of the top part.

4. The plastic ampule according to claim 1 further comprising: reinforcing members that respectively protrude continuously from an outer peripheral surface of the drug solution discharge tube at the drug solution storage part side relative to the fragile part and an outer surface of the drug solution storage part to outer sides of the drug solution discharge tube and the drug solution storage part and are mutually connected.

5. The plastic ampule according to claim 1, wherein a force required to tear open the fragile part is no more than 0.65N·m/mm with respect to a thickness of the multilayer plastic material at the drug solution discharge tube.

6. The plastic ampule according to claim 1, wherein each of the inner layer and the outer layer of the multilayer plastic material contains a high-pressure polyethylene with a density of 0.900 to 0.940 g/$cm^3$.

7. The plastic ampule according to claim 1, wherein each of the inner layer and the outer layer of the multilayer plastic material contains a polypropylene-based resin.

8. The plastic ampule according to claim 7, wherein the polypropylene-based resin is a mixture of polypropylene, a polypropylene elastomer, and a nucleating agent.

9. The plastic ampule according to claim 1, wherein the intermediate layer of the multilayer plastic material is made of a mixed resin of the cyclic olefin-based (co)polymer with the glass transition temperature of 60 to 80° C. and a high-pressure polyethylene with a density of 0.900 to 0.940 g/cm$^3$ or a high-density polyethylene with a density of 0.940 to 0.970 g/cm$^3$, and a content proportion of the high-pressure polyethylene with a density of 0.900 to 0.940 g/cm$^3$ or the high-density polyethylene with a density of 0.940 to 0.970 g/cm$^3$ in the mixed resin is no more than 30 weight %.

10. The plastic ampule according to claim 1, wherein the outer layer of the multilayer plastic material contains a colorant.

11. The plastic ampule according to claim 1, wherein the outer layer of the multilayer plastic material contains an ultraviolet absorber.

12. The plastic ampule according to claim 11, wherein the ultraviolet absorber is a benzotriazole-based ultraviolet absorber.

13. The plastic ampule according to claim 11, wherein the outer layer of the multilayer plastic material further contains metal oxide microparticles.

14. A colored plastic container formed of a thermoplastic multilayer plastic material comprising: a colored layer containing a pigment and an ultraviolet absorber; and an inner layer laminated directly or across an intermediate layer onto one side surface of the colored layer; and wherein a thickness T of the colored layer is 50 to 1000 μm, a product PT of a content proportion P (weight %) of the pigment in the colored layer and the thickness T (μm) of the colored layer satisfies Formula (1) below, and a product UT of a content proportion U (weight %) of the ultraviolet absorber in the colored layer and the thickness T (μm) of the colored layer satisfies Formula (2) below when the product PT exceeds 20 and satisfies Formula (3) below when the product PT is no more than 20

$$1 \leqq PT \leqq 150 \quad (1)$$

$$5 \leqq UT \leqq 160 \quad (2)$$

$$20 < UT \leqq 160 \quad (3).$$

15. The colored plastic container according to claim 14, wherein the other side surface of the colored layer is an outer side surface of the thermoplastic multilayer plastic material.

16. The colored plastic container according to claim 15 wherein a quotient U/T of the content proportion U (weight %) of the ultraviolet absorber in the colored layer divided by the thickness T (μm) of the colored layer satisfies Formula (4) below $$U/T \leqq 0.004 \quad (4).$$

17. The colored plastic container according to claim 14, wherein the pigment is an azo condensation pigment, and the ultraviolet absorber is a benzotriazole-based ultraviolet absorber.

18. The colored plastic container according to claim 14, wherein the thermoplastic multilayer plastic layer has a transmittance of no more than 5% with respect to light rays of wavelengths of 200 to 380 nm and a transmittance of no less than 40% with respect to light rays of a wavelength of 600 nm.

19. The colored plastic container according to claim 14 comprising a cyclic olefin polymer layer disposed between the colored layer and the inner layer.

20. The colored plastic container according to claim 14 that is a colored plastic ampule comprising: a drug solution storage part formed to a bottomed cylindrical shape and being for storing a drug solution; a drug solution discharge tube in communication with an open end of the drug solution storage part and extending toward one side; and a top part closing an end at the one side of the drug solution discharge tube, and wherein the thickness of the thermoplastic multilayer plastic layer at the drug solution storage part is 300 to 1500 μm.

21. The colored plastic container according to claim 20 formed by a blow-fill-seal method.

* * * * *